United States Patent
Han et al.

(10) Patent No.: US 12,496,343 B2
(45) Date of Patent: Dec. 16, 2025

(54) LONG-ACTING PHOTORECEPTOR-BINDING NANOPARTICLES, AND COMPOSITIONS AND METHODS THEREOF

(71) Applicant: University of Massachusetts, Boston, MA (US)

(72) Inventors: Gang Han, Shrewsbury, MA (US); Tian Xue, Lawrence Township, NJ (US)

(73) Assignee: University of Masachusetts, Westborough, MA (US)

( * ) Notice: Subject to any disclaimer, the term of this patent is extended or adjusted under 35 U.S.C. 154(b) by 618 days.

(21) Appl. No.: 17/430,132

(22) PCT Filed: Feb. 23, 2020

(86) PCT No.: PCT/US2020/019385
§ 371 (c)(1),
(2) Date: Aug. 11, 2021

(87) PCT Pub. No.: WO2020/176364
PCT Pub. Date: Sep. 3, 2020

(65) Prior Publication Data
US 2022/0096633 A1  Mar. 31, 2022

Related U.S. Application Data

(60) Provisional application No. 62/810,362, filed on Feb. 25, 2019.

(51) Int. Cl.
*A61K 41/00* (2020.01)
*A61K 47/64* (2017.01)
*A61K 47/69* (2017.01)
*A61P 27/02* (2006.01)

(52) U.S. Cl.
CPC .......... *A61K 41/00* (2013.01); *A61K 47/6415* (2017.08); *A61K 47/6929* (2017.08); *A61P 27/02* (2018.01)

(58) Field of Classification Search
CPC ................ A61K 41/00; A61K 47/6929; A61K 47/6415; A61P 27/02
See application file for complete search history.

(56) References Cited

U.S. PATENT DOCUMENTS

2014/0148880 A1* 5/2014 Deisseroth ............... B82Y 5/00
  607/100
2016/0331868 A1* 11/2016 Grubbs .................... A61F 9/00

FOREIGN PATENT DOCUMENTS

WO  WO-2018005873 A1 * 1/2018 ........... C12N 15/111

OTHER PUBLICATIONS

Bishop et al.; Glycan localization within the human interphotoreceptor matrix and photoreceptor inner and outer segments; Oxford University Press; Glycobiology vol. 3 No. 4 pp. 403-/\12, 1993 (Year: 1993) (Year: 1993).*
Zhang et al.; Facile Preparation of Well-Defined Hydrophilic Core-Shell Upconversion Nanoparticles for Selective Cell Membrane Glycan Labeling and Cancer Cell Imaging; ACS Publications; dx.doi.org/10.1021/ac402389w | Anal. Chem. 2014, 86, 482-489 Downloaded via (Year: 2014) (Year: 2014).*
Wu et al.; Non-blinking and photostable upconverted luminescence from single lanthanidedope nanocrystals; PNAS Jul. 7, 2009 vol. 106 No. 27 10917-10921 (Year: 2009).*
Zhang C et al: "Biosensing Platform Based on Fluorescence Resonance Energy Transfer from Upconverting Nanocrystals to Graphene Oxide", Angewandte Chemie, Wiley—V CH Verlag GMBH & Co. KGAA, DE, vol. 123, No. 30, Jun. 8, 2011 (Jun. 8, 2011), pp. 6983-6986. and supplemental information (Year: 2011).*
Lectin; https://www.sciencedirect.com/topics/neuroscience/lectin#:~:text=A lectin is defined as,without modifying the glycan structure. 1 (Year: 2019).*

* cited by examiner

*Primary Examiner* — Robert A Wax
*Assistant Examiner* — John W Lippert, III
(74) *Attorney, Agent, or Firm* — Milstein Zhang & Wu LLC

(57) ABSTRACT

The invention provides a novel class of long-acting photoreceptor-binding nanoparticles, methods of their preparation, and compositions and uses thereof. The invention also relates to use of such nanoparticles and compositions for NIR light sensation and pattern vision, visual enhancement and repair, and other ophthalmology therapies.

11 Claims, 12 Drawing Sheets

LONG-ACTING PHOTORECEPTOR-BINDING NANOPARTICLES, AND COMPOSITIONS AND METHODS THEREOF

PRIORITY CLAIMS AND RELATED APPLICATIONS

This application is the U.S. national phase of and claims priority to PCT/US20/19385, filed Feb. 23, 2020, which claims the benefit of priority from U.S. Provisional Application Ser. No. 62/810,362, filed on Feb. 25, 2019, the entire content of each of which is incorporated herein by reference.

TECHNICAL FIELDS OF THE INVENTION

The invention generally relates to nano-materials and compositions thereof. More particularly, the invention provides to a novel class of long-acting, photoreceptor-binding nanoparticles. The invention also provides methods of their preparation and compositions thereof. The invention additional relates to use of such nanoparticles and compositions for NIR light sensation vision, visual enhancement and repair, and other ophthalmology therapies.

BACKGROUND OF THE INVENTION

Vision is an essential sensory modality for human. Human's visual system detects light between approximately 400-700 nm, the so-called visible light. (Brill 2013 Color Res Appl 38, 333-U338; Macadam 1983 Opt Eng 22, S116-S117; Schnapf, et al. 1988 Visual Neurosci 1, 255-261.) In mammalian photoreceptor cells, the light absorbing pigments, comprised of opsins and their covalently linked retinal, are known as intrinsic photon detectors. However, the detection of longer wavelength light, such as near infrared (NIR) light, though a desirable ability, is a formidable challenge for mammals. This is because detecting such longer wavelength light, with lower energy photons, requires that opsins (e.g., human red cone opsins) must have much lowered energy barriers. Consequently, this results in unendurable high thermal noise, making NIR visual pigments impractical. (Ala-Laurila, et al. 2003 Visual Neurosci 20, 411-419; Baylor, et al. 1980 J Physiology 309, 591-621; Luo, et al. 2011 Science 332, 1307-1312; Stgeorge 1952 J Gen Physiol 35, 495-517.) This physical limitation means that no mammalian photoreceptor can effectively detect NIR light that exceeds 700 nm. Mammals are thus unable to see NIR light and to project a NIR image to the brain.

To this end, successful integration of nanoparticles with biological systems has been accelerating basic scientific discoveries and their translation into biomedical applications (Desai 2012 Aaps J 14, 282-295; Mitragotri, et al. 2015 Acs Nano 9, 6644-6654.) In order to develop abilities that do not naturally exist, miniature nanoscale devices and sensors that are designed to intimately interface with mammals, including the human vision system, are of growing interests. (Liu, et al. 2017 Nature 543, 229-233; Wu, et al. 2009 Proc Natl Acad Sci USA 106, 10917-10921.)

Unmet medical needs and technical challenges remain for novel ocular injectable materials that remedy, improve or enhance mammalian vision.

SUMMARY OF THE INVENTION

The invention provides a novel class of nanomaterials and compositions thereof that is based on long-acting photoreceptor-binding nanoparticles. The invention additionally provides method for using such nanoparticles and compositions for NIR light sensation and pattern vision, visual enhancement, visual repair, and other ophthalmology therapies.

Disclosed herein is stealthy ocular injectable nanoparticles that can serve as a built-in covert system for visual remedy, enhancement or therapy. The built-in nanoantennae are retinal photoreceptor-binding upconversion nanoparticles (UCNPs), which act as miniature energy transducers that transform mammalian invisible NIR light into short wavelength visible emissions in vivo.

A key feature of the present invention is the strategy of employing biocompatible photoreceptor binding upconversion nanoparticles (pbUCNPs) that enables NIR light sensation and pattern vision to occur.

Another key feature of the invention is that the NIR pattern vision is compatible with native daylight vision for mammalian visual enhancement and repair.

Yet another key feature of the invention is the outstanding stability and compatibility of concanavalin A protein (ConA) protein-conjugated photoreceptor binding nanoparticles. ConA surface modification provides a unique approach to allow nanoparticles to specifically stay on photoreceptor layers for up to 10 weeks by a very slow phagocytosis by the retinal pigment epithelium (RPE) cells in the mammalian retina in vivo. The ConA protein modification allow construction of long-acting photoreceptor binding drug releasing system for respective ophthalmology therapy.

The present disclosure demonstrated the successful application of UCNPs as ocular injectable NIR light transducers that allowed for the extension of mammalian vision into the NIR realm. Such implanted nanoantennae were proven to be biocompatible and did not interfere with the normal visible light vision. Animals were found to be able to detect the NIR light images simultaneously with visible light images.

The injected nanoantennae did not interfere with the animals' natural visible light vision. The ability to simultaneously detect visible and NIR light patterns provided the animals an enhanced mammalian visual performance by extending the native visual spectrum without genetic modifications and avoiding the need for the conventional bulky external devices.

This approach offers significant advantages over the currently used optoelectronic devices, including no need for any external energy supply, the stealthy nature of the present approach, as well as being its compatibility with other human activities.

In one aspect, the invention generally relates to a nanoassembly that includes: a upconversion nanoparticle (UCNP); and a glycoprotein-binding lectin covalently or non-covalently attached to the UCNP. The UCNP is capable of converting a light of a first wavelength (e.g., a near infrared (NIR) light) to a light of a second wavelength (e.g., in the visible region). The glycoprotein-binding lectin has a binding affinity to a retinal photoreceptor on a mammal vision system.

In another aspect, the invention generally relates to a pharmaceutical composition suitable for ocular injectable, comprising a nanoassembly disclosed herein and a pharmaceutically acceptable excipient, carrier, or diluent.

In yet another aspect, the invention generally relates to a mammal with a vision system having been sub-retinally injected a pharmaceutical composition disclosed herein.

In yet another aspect, the invention generally relates to a mammal-device interface. The mammal-device interface includes: an upconversion nanoparticle (UCNP); and a glycoprotein-binding lectin covalently or non-covalently attached to the UNCP. The UCNP is capable of converting a near infrared (NIR) light to a wavelength in the visible region. The glycoprotein-binding lectin is covalently bond to a retinal photoreceptor on a vision system of a mammal.

In yet another aspect, the invention generally relates to a method for treating an ocular disease or condition of a mammal. The method includes administering to the mammal a composition comprising a upconversion nanoparticle (UCNP) and a glycoprotein-binding lectin covalently or non-covalently attached to the UCNP, optionally with a diagnostic or therapeutic agent conjugated thereto, wherein the UCNP is capable of converting a light of a first wavelength in the non-visible region of the mammal to a light of a second wavelength in the visible region of the mammal; and the glycoprotein-binding lectin has a binding affinity to a retinal photoreceptor on the mammal vision system.

In yet another aspect, the invention generally relates to a method for delivering a drug to an ocular location of a mammal. The method includes administering to the mammal a composition comprising a glycoprotein-binding lectin covalently attached thereto a therapeutic or diagnostic agent, wherein the glycoprotein-binding lectin has a binding affinity to a retinal photoreceptor on the mammal vision system.

DETAILED DESCRIPTION OF THE INVENTION

Figure 1:
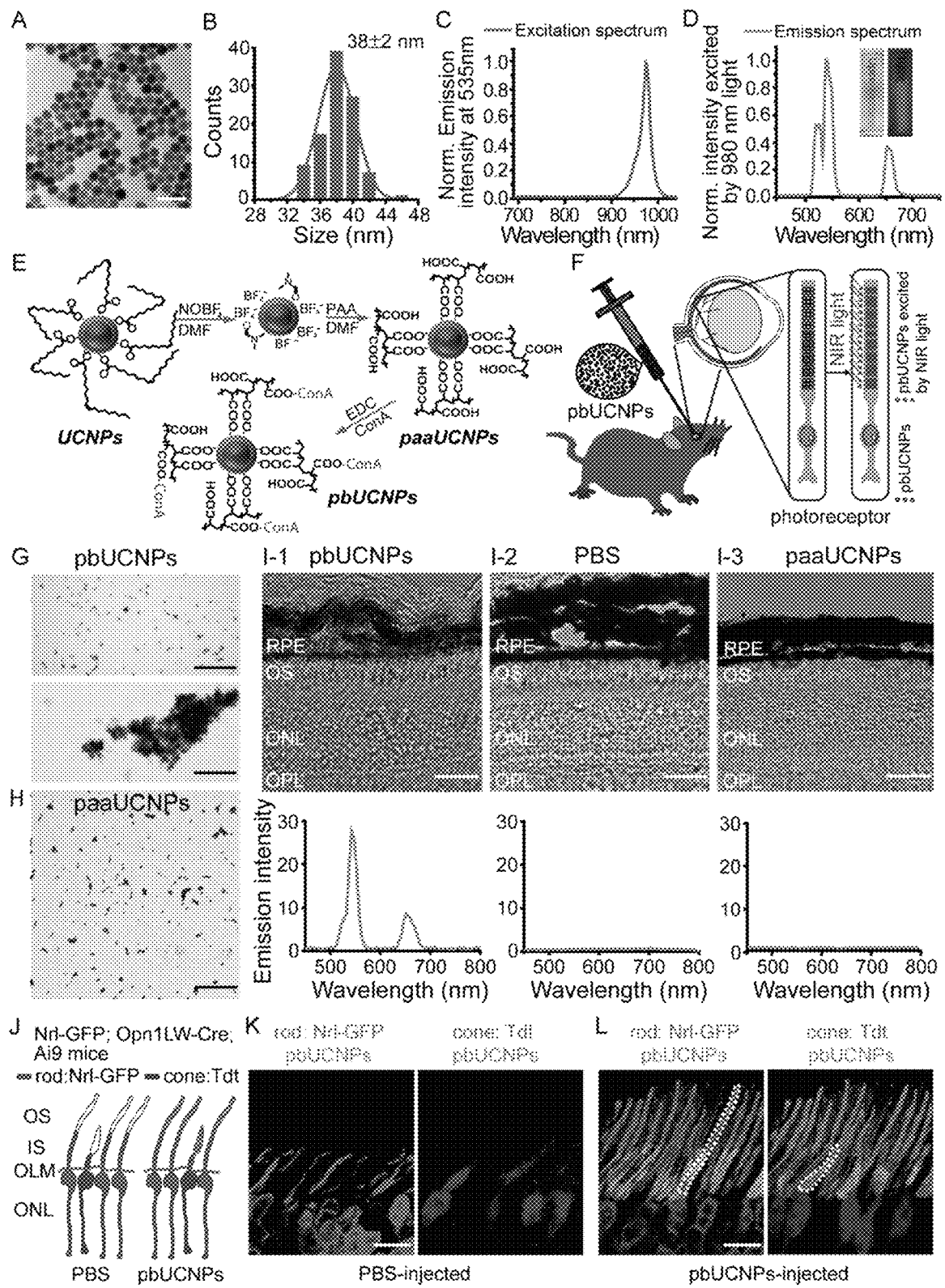
FIG. 1. Photoreceptor-binding upconversion nanoparticles (pbUCNPs) (A) Transmission electron microscope (TEM) image of UCNPs (as-synthesized core/shell structured β-NaYF$_4$:20% Yb, 2% Er@β-NaYF$_4$). Scale bar: 100 nm. (B) The corresponding size distribution of UCNPs. (C) The excitation spectrum of UCNPs which was measured as the emission light intensity at 535 nm by 700-1040 nm excitation. (D) The emission spectrum of UCNPs upon 980-nm continuous wave (CW) laser irradiation. Inset displays photographs of UCNPs solutions with (right) and without (left) 980-nm CW laser excitation. (E) Schematic illustration of the surface modification procedures for ConA-functionalized pbUCNPs. (F) Left: illustration of sub-retinal injection of pbUCNPs in mice. Right: illustrations of pbUCNPs binding to the outer segments of rod photoreceptors and generation of green light upon NIR light illumination. (G) TEM images of pbUCNPs before (upper) and after (bottom) addition of 200 nM β-cyclodextrin showing characteristic aggregation of pbUCNPs in the presence of β-cyclodextrin. Scale bar: 2 µm. (H) TEM images of UCNPs without ConA-conjugation (paaUCNPs) mixed with 200 nM β-cyclodextrin, showing no obvious aggregation. Scale bar: 2 µm. (I) Upper: overlays of transmission and luminescence optical images (green: 980 nm excitation/535 nm emission) of retinal slices from pbUCNPs-injected, phosphate buffer solution (PBS)-injected and paaUCNP-injected mice. Bottom: emission spectrum recorded from the retinal outer segment layers (ONL) upon 980-nm light excitation. All the retinal slices were first fixed by paraformaldehyde (PFA) and then washed with PBS. Only pbUCNPs remained binding to the photoreceptor outer segments. RPE: Retinal Pigment Epithelium; OS: Outer Segment of photoreceptors; ONL: Outer Nuclear Layer; OPL: Outer Plexiform Layer. Scale bar: 30 µm. (J) The schematic illustration of the distribution of pbUCNPs (green) in the retina. Rods are labeled with Nrl-GFP in pseudo color violet. Cones are label with Opn1LW cre; A19-lsl-tdTomato in pseudo color red. (K and L) Overlayed green (pbUCNPs)/violet (rods) and green (pbUCNPs)/red (cones) channel fluorescence images of retina from PBS-injected mice (K) and pbUCNPs-injected mice (L). Examples of continuous inner and outer segment of a rod and a cone were shown in the dashed contour lines. Scale bars are 10 µm.

The invention is based in part on the unexpected discovery of a novel class of long-acting photoreceptor-binding nanoparticles, methods of their preparation and compositions thereof. The invention also relates to use of such nanoparticles and compositions for NIR light sensation and pattern vision, visual enhancement and repair, and other ophthalmology therapies.

Mammals cannot see light at a wavelength of over 700 nm. This inability with respect to visual spectrum is due to the inherent physical thermodynamic limitations of opsin, the unique mammalian photon detecting protein on the retinal photoreceptors. The detection of longer wavelength light, such as NIR light, though a much-desired ability, is a formidable challenge for mammals.

Disclosed herein are compositions and methods based on novel ocular injectable pbUCNPs that can be intimately integrated with the mammalian retinal photoreceptors with negligible side effects. These nanoparticles can anchor on retinal photoreceptors as miniature covert NIR light transducers in order to create mammalian NIR light image vision. Through extensive physiological examination, from single photoreceptor recordings and electroretinogram (ERG) analyses, to cortical recordings and a wide variety of visual behavior tests, it has been demonstrated that mice injected with these nanoantennae can, not only perceive NIR light, but also obtain NIR light pattern vision.

These injected mice are able to differentiate between sophisticated NIR shape patterns (such as triangles and circles) even after 10 weeks without the need of any repeated injections. Moreover, the NIR light pattern vision is also ambient daylight compatible, which is in parallel with conventional mammalian vision. Due to the close proximity of the nanoantennae and photoreceptors, the exceptionally low power NIR light-emitting diode (LED) lamp light is sufficient to drive such special NIR visual perception. The present invention provides exceptional opportunities for both fundamental vision studies and a wide variety of emerging bio-integrated nanodevice designs and applications, including pbUCNPs capable of multicolor NIR light sensitivities that have multiple NIR light absorption peak wavelengths and corresponding multi-color visible light emissions.

In one aspect, the invention generally relates to a nano-assembly that incudes: a upconversion nanoparticle (UCNP); and a glycoprotein-binding lectin covalently or non-covalently attached to the UCNP. The UCNP is capable of converting a light of a first wavelength (e.g., a near infrared (NIR) light) to a light of a second wavelength (e.g., in the visible region). The glycoprotein-binding lectin has a binding affinity to a retinal photoreceptor on a mammal vision system.

In certain embodiments, the glycoprotein-binding lectin has a binding affinity to a glycoprotein on the retinal photoreceptor.

In certain embodiments, the first wavelength (e.g., in NIR region) is in the range from about 700 nm to about 1,700 nm (e.g., from about 700 nm to about 1,000 nm, from about 1,000 nm to about 1,300 nm, from about 1,300 nm to about 1,700 nm).

In certain embodiments, the second wavelength (e.g., in the visible region) is in the range from about 400 nm to about 700 nm (e.g., about 400 nm to about 500 nm, about 500 nm to about 600 nm, about 600 nm to about 700 nm).

In certain embodiments, the UCNP has a core/shell structure. In certain embodiments, the UCNP comprises a $Yb^{3+}$ sensitizer and a $Er^{3+}$ emitter. In certain embodiments, the UCNP comprises a host matrix of β-NaYF4. In certain embodiments, the UCNP comprises β-NaYF4:Yb, Er@β-NaYF4, wherein the doping ratio of Yb is present at about 5% to about 99.5% (e.g., about 5% to about 95%, about 5% to about 85%, about 5% to about 75%, about 5% to about 50%, about 5% to about 35%, about 5% to about 20%, about 5% to about 10%, about 10% to about 99.5%, about 20% to about 99.5%, about 35% to about 99.5%, about 50% to about 99.5%, about 75% to about 99.5%, about 90% to about 99.5%) and Er is present at about 0.1% to about 95% (e.g., about 0.1% to about 95%, about 0.1% to about 85%, about 0.1% to about 75%, about 0.1% to about 50%, about 0.1% to about 10%, about 0.1% to about 1%, about 1% to about 95%, about 5% to about 95%, about 10% to about 95%, about 20% to about 95%, about 50% to about 95%, about 75% to about 95%, about 90% to about 95%).

In certain embodiments, the UCNP has a size in the range from about 1 nm to about 1,000 nm.

In certain embodiments, the glycoprotein-binding lectin is covalently attached to the UNCP via a polyacrylic acid coated on the UCNP.

In certain embodiments, the glycoprotein-binding lectin is concanavalin A protein (ConA).

In certain embodiments, the nanoassembly is water soluble. In certain embodiments, the nanoassembly is biocompatible.

In another aspect, the invention generally relates to a pharmaceutical composition suitable for ocular injectable, comprising a nanoassembly disclosed herein and a pharmaceutically acceptable excipient, carrier, or diluent.

As used herein, the term "pharmaceutically acceptable" excipient, carrier, or diluent refers to a pharmaceutically acceptable material, composition or vehicle involved in carrying or transporting the subject pharmaceutical agent from the desired organ of the body, or portion thereof, such as the retina. Each carrier must be "acceptable" in the sense of being compatible with the other ingredients of the formulation and not injurious to the patient.

In certain embodiments, the pharmaceutical composition is suitable for sub-retinal space injection to a mammal. In certain embodiments, the pharmaceutical composition is suitable for sub-retinal space injection to a mouse. In certain embodiments, the pharmaceutical composition is suitable for sub-retinal space injection to a dog. In certain embodiments, the pharmaceutical composition is suitable for sub-retinal space injection to a human.

In yet another aspect, the invention generally relates to a mammal with a vision system having been sub-retinally injected a pharmaceutical composition disclosed herein.

In certain embodiments, the mammal is a mouse. In certain embodiments, the mammal is a dog. In certain embodiments, the mammal is a human.

In certain embodiments, the mammal is capable of perceiving NIR light.

In certain embodiments, the mammal is capable of perceiving NIR light for about 1 or more days post injection of the pharmaceutical composition.

In certain embodiments, the mammal is capable of perceiving NIR light for about 5 or more days post injection of the pharmaceutical composition.

In certain embodiments, the mammal is capable of perceiving NIR light for about 1 to 5 weeks post injection of the pharmaceutical composition. In certain embodiments, the mammal is capable of perceiving NIR light for 5 to 10 weeks post injection of the pharmaceutical composition.

In certain embodiments, the mammal is capable of perceiving NIR light pattern.

In certain embodiments, the mammal is capable of perceiving NIR light pattern for about 1 or more days post injection of the pharmaceutical composition.

In certain embodiments, the mammal is capable of perceiving NIR light pattern for about 5 or more days post injection of the pharmaceutical composition.

In certain embodiments, the mammal is capable of perceiving NIR light pattern for about 1 to 5 weeks post injection of the pharmaceutical composition. In certain embodiments, the mammal is capable of perceiving NIR light pattern for 5 to 10 weeks post injection of the pharmaceutical composition.

In yet another aspect, the invention generally relates to a mammal-device interface. The mammal-device interface includes: a upconversion nanoparticle (UCNP); and a glycoprotein-binding lectin covalently or non-covalently attached to the UCNP. The UCNP is capable of converting a near infrared (NIR) light to a wavelength in the visible region. The glycoprotein-binding lectin is covalently bond to a retinal photoreceptor on a vision system of a mammal.

In certain embodiments, the mammal of the mammal-device interface is a mouse. In certain embodiments, the mammal of the mammal-device interface is a dog. In certain embodiments, the mammal of the mammal-device interface is a human.

In certain embodiments, the mammal-device interface disclosed herein serves as a miniature built-in or covert light (e.g., NIR light) transducer or nanoantenna.

In yet another aspect, the invention generally relates to a method for treating an ocular disease or condition of a mammal. The method includes administering to the mammal a composition comprising a upconversion nanoparticle (UCNP) and a glycoprotein-binding lectin covalently or non-covalently attached to the UCNP, optionally with a diagnostic or therapeutic agent conjugated thereto, wherein the UCNP is capable of converting a light of a first wavelength in the non-visible region of the mammal to a light of a second wavelength in the visible region of the mammal; and the glycoprotein-binding lectin has a binding affinity to a retinal photoreceptor on the mammal vision system.

In certain embodiments of the method, the glycoprotein-binding lectin has a binding affinity to a glycoprotein on the retinal photoreceptor.

In certain embodiments of the method, the first wavelength is in the range from about 700 nm to about 1,700 nm (e.g., from about 700 nm to about 1,000 nm, from about 1,000 nm to about 1,300 nm, from about 1,300 nm to about 1,700 nm).

In certain embodiments of the method, the second wavelength is in the range from about 400 nm to about 700 nm (e.g., about 400 nm to about 500 nm, about 500 nm to about 600 nm, about 600 nm to about 700 nm).

In certain embodiments of the method, the UCNP has a core/shell structure.

In certain embodiments of the method, the UCNP comprises a $Yb^{3+}$ sensitizer and a $Er^{3+}$ emitter.

In certain embodiments of the method, a host matrix of β-NaYF4.

In certain embodiments of the method, the UCNP comprises β-NaYF4:Yb, Er@β-NaYF4, wherein the doping ratio of Yb is present at about 5% to about 99.5% (e.g., about 5% to about 95%, about 5% to about 85%, about 5% to about 75%, about 5% to about 50%, about 5% to about 35%, about 5% to about 20%, about 5% to about 10%, about 10% to about 99.5%, about 20% to about 99.5%, about 35% to about 99.5%, about 50% to about 99.5%, about 75% to about 99.5%, about 90% to about 99.5%) and Er is present at about 0.1% to about 95% (e.g., about 0.1% to about 95%, about 0.1% to about 85%, about 0.1% to about 75%, about 0.1% to about 50%, about 0.1% to about 10%, about 0.1% to about 1%, about 1% to about 95%, about 5% to about 95%, about 10% to about 95%, about 20% to about 95%, about 50% to about 95%, about 75% to about 95%, about 90% to about 95%).

In certain embodiments of the method, the UCNP has a size in the range from about 1 nm to about 1,000 nm (e.g., about 10 nm to about 1,000 nm, about 50 nm to about 1,000 nm, about 100 nm to about 1,000 nm, about 500 nm to about 1,000 nm, about 1 nm to about 500 nm, about 1 nm to about 100 nm, about 1 nm to about 50 nm, about 1 nm to about 10 nm).

In certain embodiments of the method, the glycoprotein-binding lectin is covalently attached to the UCNP via a polyacrylic acid coated on the UCNP.

In certain embodiments of the method, the glycoprotein-binding lectin is concanavalin A protein (ConA).

In certain embodiments of the method, the mammal is a mouse. In certain embodiments of the method, the mammal is a dog. In certain embodiments of the method, the mammal is a human.

The method of the invention may be used to treat a number of diseases or conditions, including for example, retinal disorders.

In yet another aspect, the invention generally relates to a method for delivering a drug to an ocular location of a mammal. The method includes administering to the mammal a composition comprising a glycoprotein-binding lectin covalently attached thereto a therapeutic or diagnostic agent, wherein the glycoprotein-binding lectin has a binding affinity to a retinal photoreceptor on the mammal vision system.

In certain embodiments of the method, the glycoprotein-binding lectin is concanavalin A protein (ConA).

In certain embodiments of the method, the mammal is a mouse. In certain embodiments of the method, the mammal is a dog. In certain embodiments of the method, the mammal is a human.

EXAMPLES

In particular, the human eye is most sensitive to visible light at the electromagnetic wavelength of approximately 550 nm in photopic condition. (Bieber, et al. 1995 *Vision Research* 35, 1385-1392; Boynton, et al. 1996 *J Opt Soc Am A* 13, 1609-1621.) To convert NIR light to this wavelength, core/shell structured upconversion nanoparticles (UCNPs, i.e., 38±2 nm β-NaYF4:20% Yb, 2% Er@β-NaYF4) were generated (FIGS. 1A and 1B) that had excitation spectrum peaked at 980 nm and an emission peak at ~535 nm upon 980-nm light irradiation (Mai, et al. 2006 *J Am Chem Soc* 128, 6426-6436; Wu, et al. 2015 *Bioconjugate Chem* 26, 166-175.) (FIGS. 1C and 1D).

Figure 7:
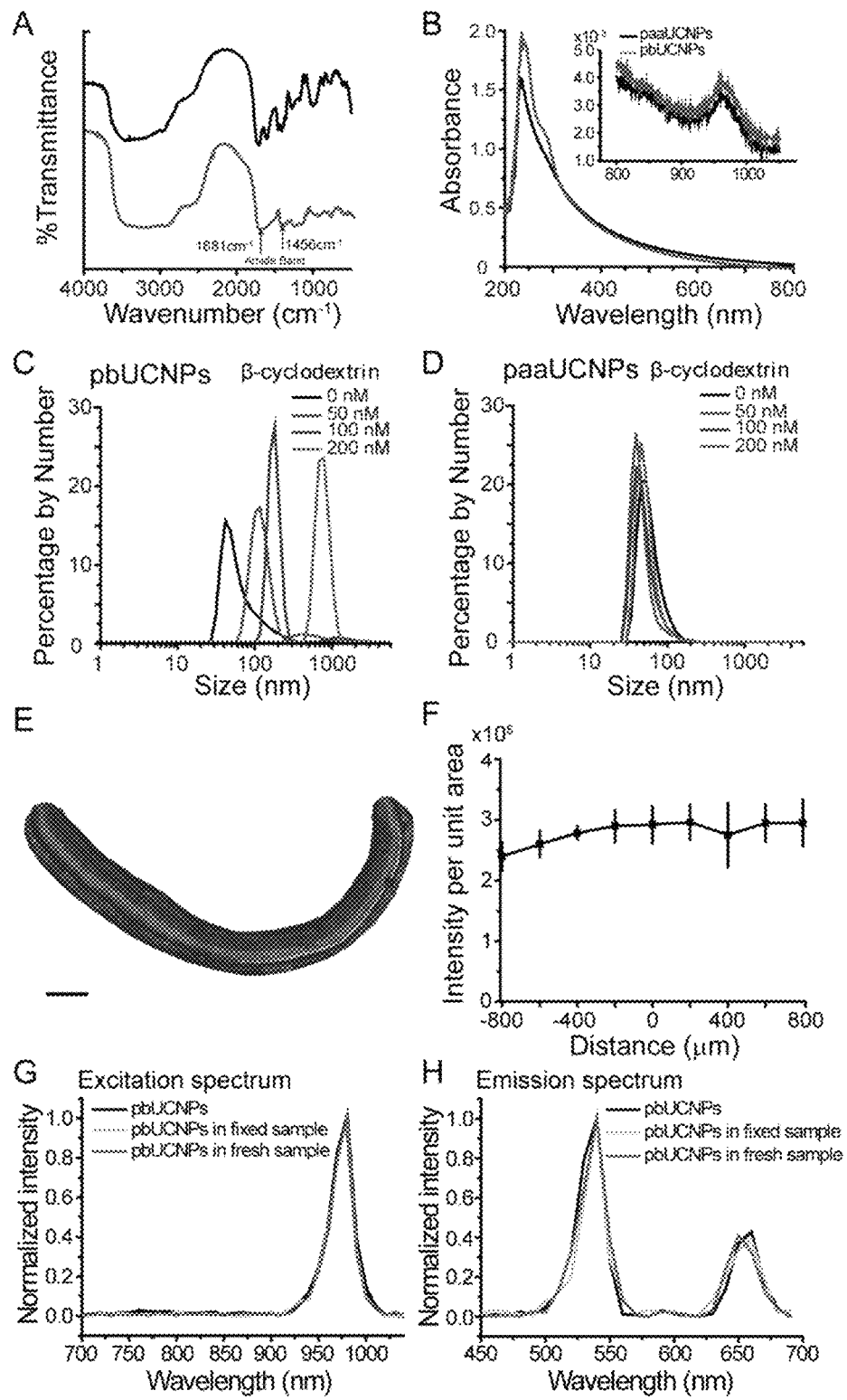
FIG. 7. Properties of UCNPs and distribution in subretinal space, related to FIG. 1. (A) Fourier Transform-Infrared (FT-IR) spectra of UCNPs before (black) and after (red) ConA surface modifications. After ConA conjugation, new peaks at 1681 and 1456 $cm^{-1}$ emerged, which are attributed to amide bond formation. (B) Absorption spectrum of UCNPs before (black) and after (red) ConA conjugation. A new absorption peak at 285 nm is assigned to ConA. NIR range absorption is shown in inset, and the absorption peak at 980 nm is attributed to the absorption for upconversion. (C) Dynamic light scattering (DLS) spectrum of pbUCNPs (0.2 mg/mL) upon the introduction of different concentrations of β-cyclodextrins (0, 50, 100 and 200 nM) showing aggregation of pbUCNPs. (D) Dynamic light scattering spectrum of paaUCNPs (0.2 mg/mL) upon the introduction of different concentrations of β-cyclodextrins (0, 50, 100 and 200 nM). (E) Illustration of subretinal injection of pbUCNPs. (F) Distribution of pbUCNPs (green) in the subretinal space after a single injection. Scale bar: 250 (G) Quantified green light intensity distribution along the spread of pbUCNPs in the subretinal space (n=4). Data are presented as mean±SD. X axis is the distance from the injection site and y axis is the total green pbUCNPs emission intensity of a series of 50×50 μm2 measuring windows on retina along the distribution of pbUCNPs from the injection site. (H and I) Excitation (H) and emission (I) spectra of pbUCNPs in solution (black), fixed retina (grey) and fresh retina (violet).

Water-soluble photoreceptor-binding UCNPs (pbUCNPs) were obtained from conjugation of ConA with paaUCNPs (poly acrylic acid coated UCNPs). ConA can bind to sugar residue and derivatives of the photoreceptor outer segment, forming glyosidic bonds. (Bridges, et al. 1981 *Invest Ophth Vis Sci* 20, 8-16; Bridges, et al. 1980 *Photochem Photobiol* 32, 481-486; Rutishauser, et al. 1975 *J Cell Boil* 65, 247-257.) The successful ConA conjugation on the surface of the UCNP was evidenced by the appearance of N—H bending peaks in the Fourier Transform-Infrared (FT-IR) spectrum (FIG. 7A) and the ~285 nm protein absorption on Ultraviolet-visible spectroscopy (UV/Vis) spectrum (FIG. 7B).

To confirm the glyosidic bonds between ConA and glycoproteins, β-cyclodextrin was added, which possesses a similar glucosyl unit as that found on the photoreceptor outer segment, to the pbUCNPs solution. Characteristic ConA-β-cyclodextrin aggregation was found to occur, as can be seen in the transmission electron microscope (TEM) images (FIG. 1G) and the dynamic light scattering (DLS) spectrum (FIG. 7C). This result indicates that pbUCNPs are able to bind to the glycoproteins on the photoreceptor outer segment. In contrast, the paaUCNPs without ConA remained monodispersed when β-cyclodextrin was added (FIGS. 1I1 and 7D). After injecting these pbUCNPs into the mouse sub-retinal spaces (FIGS. 1F and 7E), it was observed that through the glyosidic bond, these pbUCNPs spread homogenously in the sub-retinal space (FIGS. 1I left, 7F and 7G), self-anchored and remained tightly bound to the inner and outer segments of both rods and cones (FIG. 1J-1L), forming a layer of built-in nanoantennae with the characteristic upconversion spectrum (FIG. 1I left). In contrast, the injected paaUCNPs were loosely bound and easily removed from the photoreceptors with gentle washing (FIG. 1I right).

Next evaluated were the biocompatibility and potential side effects of pbUCNPs in vivo. As a result, it was found that the pbUCNPs injection did not cause any higher rate of adverse reaction as compared to the control PBS injection. All these common minor transient side effects (e.g., cataracts, corneal opacity) that are generally associated with sub-retinal injection completely went away 2 weeks after injections (Table 1). (Qi, et al. 2015 *Plos One* 10; Zhao, et al. 2011 *Am J Pathol* 179, 1265-1277.) In addition, the possible retinal degeneration was evaluated by counting the number of photoreceptors in the retinal outer nuclear layer (ONL), which is a standard and widely used method in the field of retinal research, based on the fact that the photoreceptors are quite sensitive and prone to degenerate upon stress (Chen, et al. 2006 *Nat Nanotechnol* 1, 142-150; Namekata, et al. 2013 *Cell Death Differ* 20, 1250-1256; Wang, et al. 2013 *Pharmacogn Mag* 9, 149-154.)

TABLE 1

Figure 2:
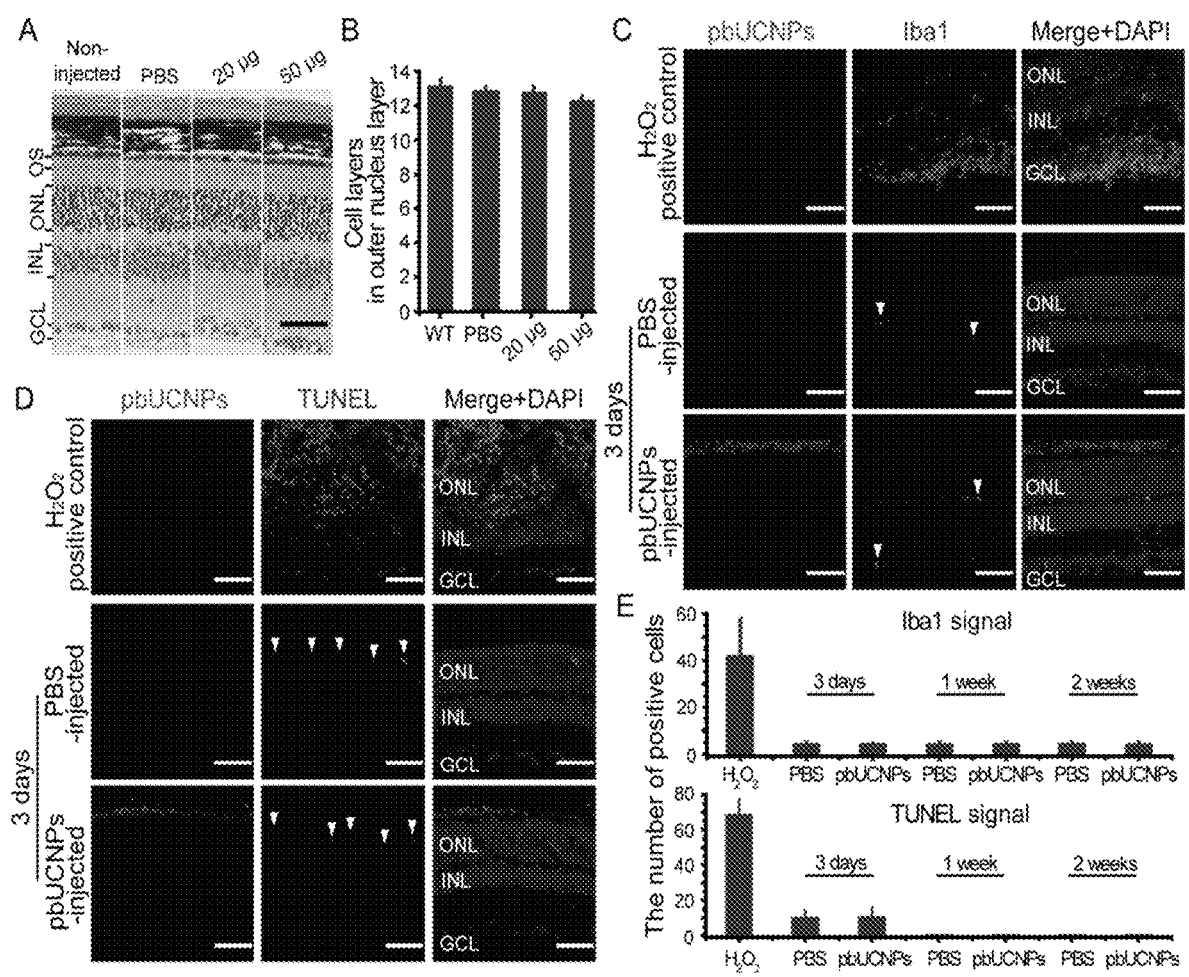
FIG. 2. Biocompatibility of pbUCNPs. (A) Hematoxylin-eosin (HE) staining of retinal slices from non-injected, PBS-injected, 20 µg/eye and 50 µg/eye pbUCNPs-injected mice. OS: Outer Segment of photoreceptors; ONL: Outer Nuclear Layer; INL: Inner Nuclear Layer; GCL: Ganglion Cell Layer. Scale bar: 50 µm. (B) The number of cell layers in the outer nucleus layer (ONL) of retinas. Data are presented as mean±standard deviation (SD). (C) Microglia marker Iba1 staining of retinal slices 3 days after injection. The positive control was retina from H$_2$O$_2$-injected mice showing strong activation of microglia. Few basal Iba1 signals in the pbUCNPs-injected retina similar to that from PBS-injected retina (indicated by arrow heads). Red: Iba1; Green: pbUCNPs emission upon excitation by NIR light; Blue: DAPI (4', 6-Diamidino-2-Phenylindole) signal indicating cell nucleuses. Scale bar: 50 µm. (D) Apoptosis detection by TUNEL (Terminal deoxynucleatidyl Transferase mediated dUTP Nick End Labeling) staining 3 days after injection. Strong TUNEL signals in retinas from H$_2$O$_2$-injected mice as positive control and few TUNEL signals from PBS-injected and pbUCNPs-injected mice (indicated by arrow heads). Red: TUNEL staining; Green: pbUCNPs emission upon excitation by NIR light; Blue: DAPI. Scale bar: 50 µm. (E) The number of Iba1 and TUNEL stained cells per 0.04 mm$^2$ averaged from 4 retinas in a series of time after injection. See also FIG. 9 and FIG. 10. Data are presented as mean±SD.

Common transient effects following injection, related to FIG. 2.

| Post Injection Time | PBS injected(20 eyes) | | | | | |
|---|---|---|---|---|---|---|
| | Injected eyes | Injection failure | Retina detachment | Bleeding | Cataract | Corneal opacity |
| Day 0 | 20 | 0 | 20 | 1 | 3 | 8 |
| Day 1 | — | — | 20 | — | 3 | 7 |
| Day 3 | — | — | 14 | — | 2 | 3 |

TABLE 1-continued

Common transient effects following injection, related to FIG. 2.

| | | | | | |
|---|---|---|---|---|---|
| Day 7 | — | 0 | — | 0 | 1 |
| Day 14 | — | 0 | — | 0 | 0 |

| Post Injection Time | pbUCNPs injected (20 eyes) | | | | | |
|---|---|---|---|---|---|---|
| | Injected eyes | Injection failure | Retina detachment | Bleeding | Cataract | Corneal opacity |
| Day 0 | 20 | 0 | 20 | 0 | 2 | 6 |
| Day 1 | — | — | 20 | — | 2 | 6 |
| Day 3 | — | — | 16 | — | 1 | 3 |
| Day 7 | — | — | 0 | — | 0 | 2 |
| Day 14 | — | — | 0 | — | 0 | 0 |

Figure 8:
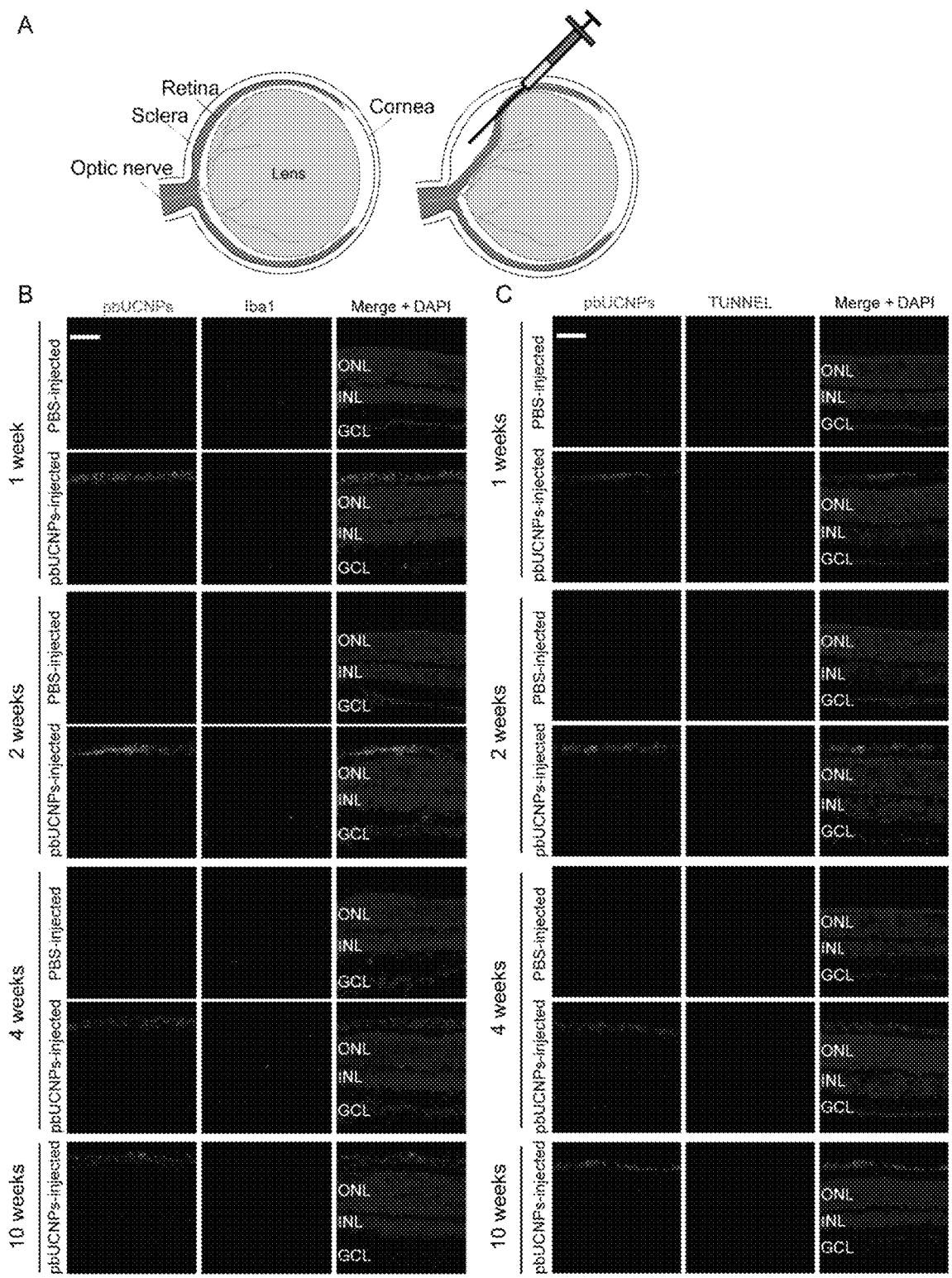
FIG. 8. Toxicity and biocompatibility evaluation of retina slices in a time series up to 10 weeks after injection, related to FIG. 2. (A) Microglia marker Iba1 staining of retina slices. Retinal injection of 6 mM $H_2O_2$ was used as the positive control. Red: Iba1; Green: pbUCNPs emission upon excitation by NIR light; Blue: DAPI (4', 6-Diamidino-2-Phenylindole) signal indicating cell nucleuses. Scale bar: 50 (B) TUNEL staining of retina slices. Retinal injection of 6 mM $H_2O_2$ was used as the positive control. Red: TUNEL staining; Green: pbUCNPs emission upon excitation by NIR light; Blue: DAPI. Scale bar: 50 μm.

The retinal layer structure and the number of photoreceptor layers in the retinal ONL were not changed even with 50 μg pbUCNPs injected per eye, examined up to two months after injections (FIGS. 2A and 2B). This result clearly indicates that there is no obvious retinal degeneration using this standard measurement. Moreover, potential inflammation was examined in the retinal through microglia marker-Iba1 staining which is a widely used indicator of microglia accumulation. (Krady, et al. 2005 *Diabetes* 54, 1559-1565.) In this experiment, it was observed negligible retinal inflammation at 3 days, 1, 2, 4 and 10 weeks after pbUCNPs injection (FIGS. 2C, 2E and 8A). Further examined was retinal cell apoptosis after injection via terminal deoxynucleotidyl transferase dUTP nick-end labeling (TUNEL). Only sparse TUNEL signals were found 3 days after injection in both the PBS and pbUCNPs-injected retinas (FIG. 2D), and then TUNEL signal became undetectable at 1, 2, 4 and 10 weeks after pbUCNPs injection (FIGS. 2E and 8B).

These results demonstrated that pbUCNPs injection did not cause obvious acute and long-term side effect. In addition, the excitation and emission spectra of pbUCNPs in either fixed or fresh retina were in good agreement with those measured from pbUCNPs solutions, indicating that binding with photoreceptors did not change the characteristics of pbUCNPs (FIGS. 711 and 1I).

NIR Light Mediated Photoreceptor Activation

Figure 3:
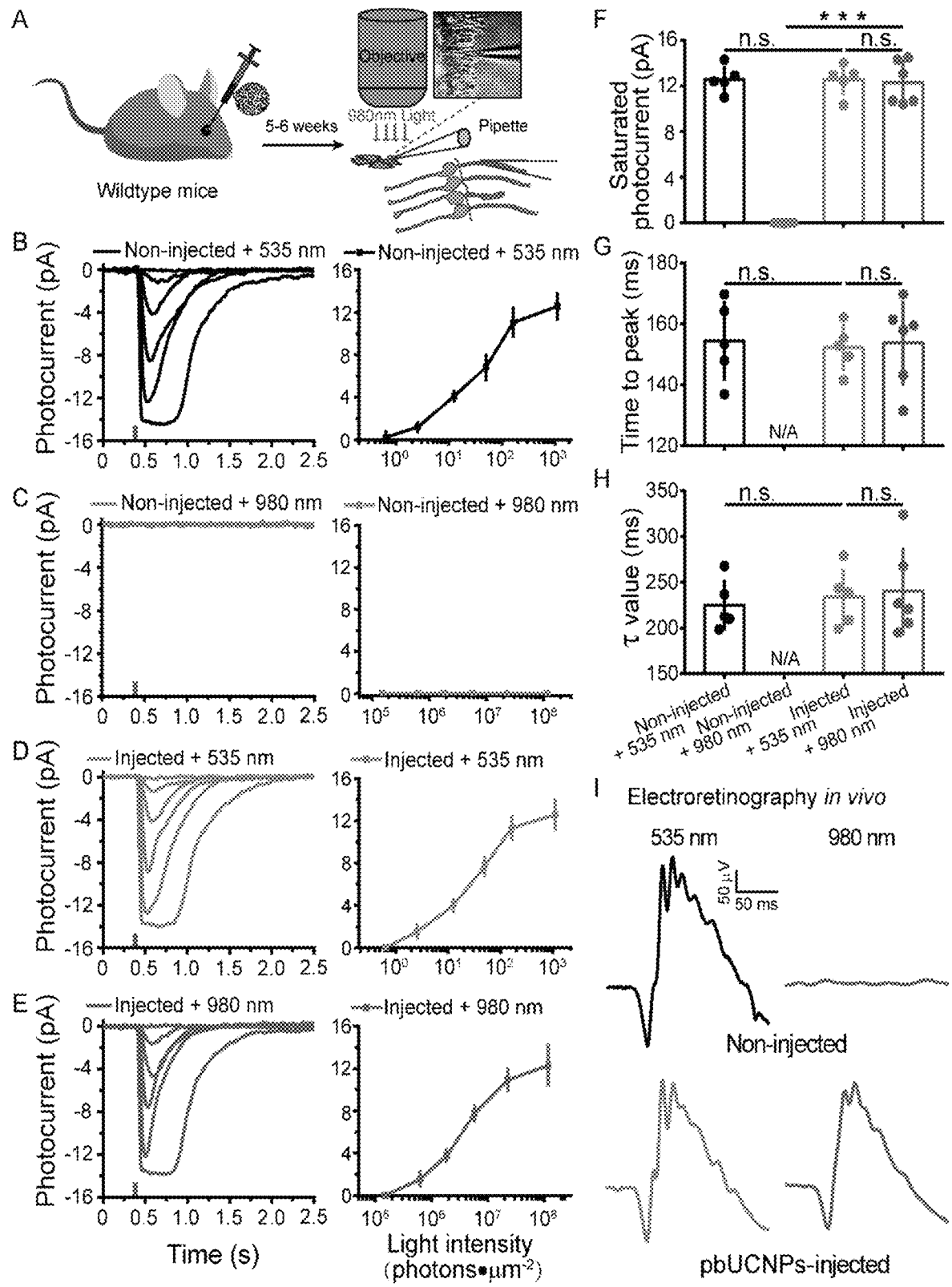
FIG. 3. NIR light mediated photoreceptor activation by pbUCNPs. (A) Illustration of rod outer segment suction recordings from freshly isolated retina. Stimulation light was either 980 nm or 535 nm through the imaging objective. (B-E) Photocurrents and intensity-response curve of rods from non-injected mice with 535-nm (B) (n=5) or 980-nm (C) (n=6) light stimulations, and pbUCNPs-injected mice with 535 nm (D) (n=5) or 980 nm (E) (n=6) light stimulations. The tiny colored vertical bars on the x axis indicated the time of light flashes. Photocurrent traces were averaged from 5-7 sweeps. Intensity-response data are presented as mean±SD. (F) Saturating photocurrent in B-E. (G) Time-to-peak: time from light stimulation to peak amplitude in B-E. (H) Decay time constant of dim light photocurrent in B-E. Data are presented as mean±SD. n.s. not significant; ***p<0.001. (I) Electroretinograms (ERG) recorded from mice under 535-nm or 980-nm light stimulation. No response was observed in non-injected control mice under 980-nm light stimulation (grey). Light intensities: 535 nm: $8.26 \times 10^3$ photons·µm$^{-2}$; 980 nm: $9.83 \times 10^8$ photons·µm$^{-2}$.
Figure 9:
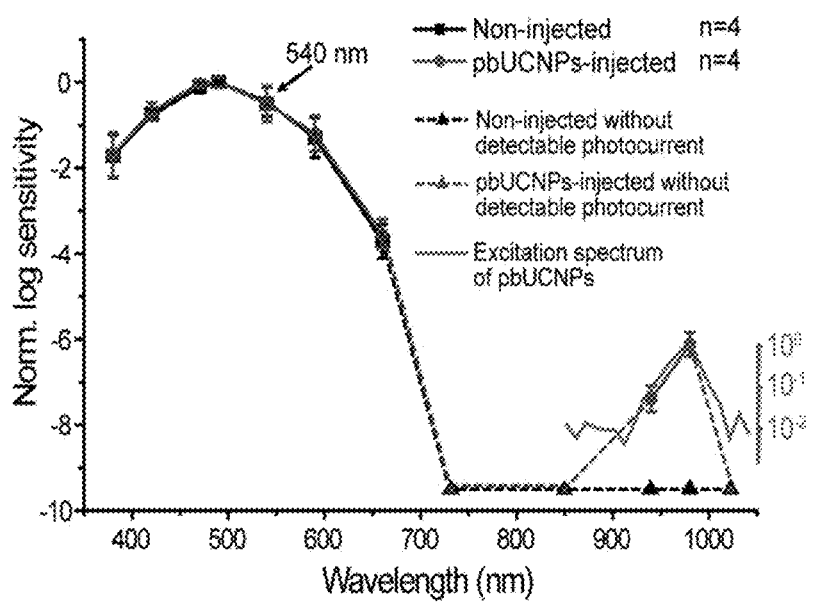
FIG. 9. Action spectra of rods and ERG of cones, related to FIG. 3. (A) Left: Action spectra of rods from non-injected (grey) and pbUCNPs-injected (red) retina. Fit of action spectrum of rods from non-injected retina to absorption-spectrum template is shown in dotted blue line. Open squares and circles are theoretical predicted values from the fit under detection threshold. Right: Same action spectra were plotted with excitation spectrum of pbUCNPs (green), which is normalized to the action spectrum value of 980 nm of rods from pbUCNPs-injected mice. (B) ERG recordings of Gnat1−/− mice. Light intensities are $7.26 \times 10^3$ photons·μm-2 for 535-nm light and $8.01 \times 10^7$ photons·μm-2 for 980-nm light.
Figure 9:
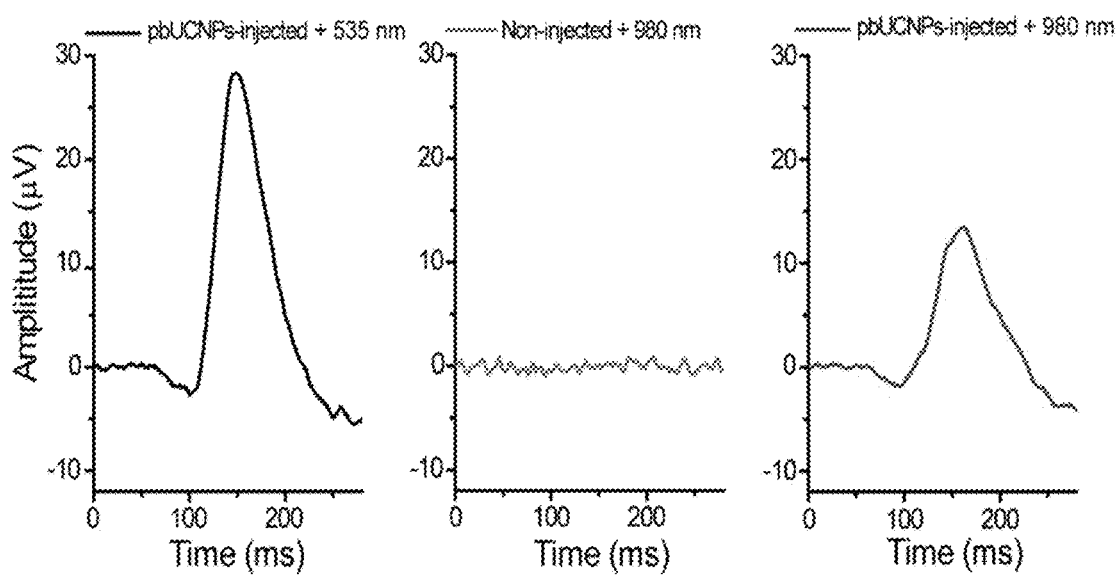
Figure 10:
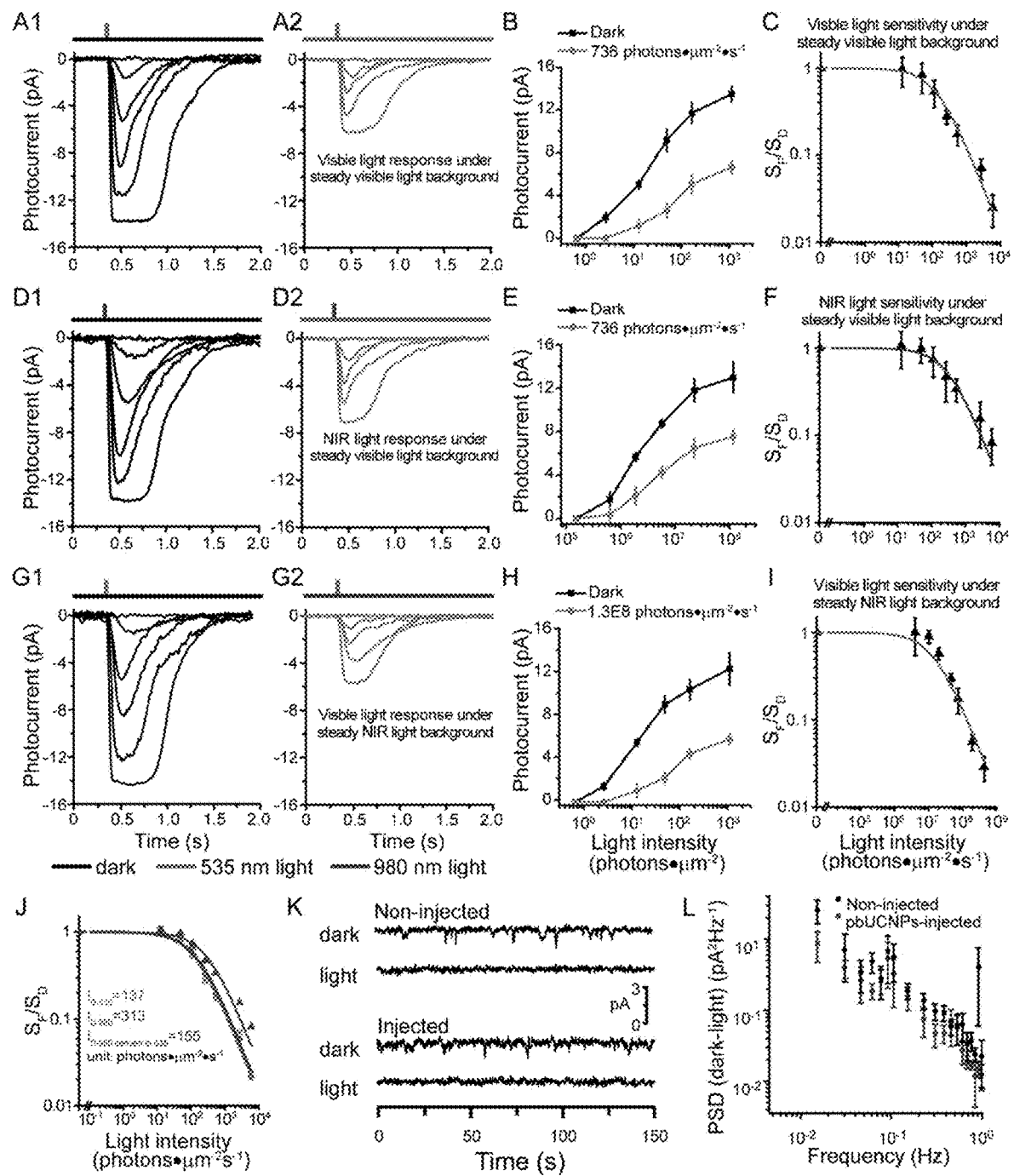
FIG. 10. Adaptation and noise properties of rods from pbUCNPs-injected retina, related to FIG. 3. (A) Visible light flash responses of rod photoreceptors under dark and visible light background. Background and light stimulations were illustrated on top of the recording traces (A, D and G). (B) Intensity-response curves of rods in (A) under dark background and the specified background 535-nm light intensity of 736 photons·μm-2·s-1 (n=3). (C) Normalized flash sensitivity is plotted as a function of background light intensity and fitted with Weber-Fechner equation SF/SD=1/[1+IB/I0]. The visible background light intensity that decreased the visible flash light sensitivity by half, I0(V/V), is 137 photons·μm-2·s-1, which is similar to values in previous studies. (n=3). (D) NIR light flash responses of rod photoreceptors under dark and visible light background. (E) Intensity-response curve of rods in (D) under dark background and the specified background 535-nm light intensity of 736 photons·μm-2·s-1 (n=3). (F) Normalized flash sensitivity is plotted as a function of background light intensity and fitted with Weber-Fechner equation (n=3). The visible background light intensity that decreased the NIR flash light sensitivity by half, I0(N/V), is 313 photons. μm-2·s-1. (G) Visible light flash responses of rod photoreceptors under dark and NIR light background. (H) Intensity-response curve of rods in (G) under dark background and the specific background light intensity of 1.3×108 photons·μm-2·s-1 (n=3). (I) Normalized flash sensitivity is plotted as a function of background light intensity and fitted with Weber-Fechner equation (n=3). The NIR background light intensity that decreased the visible light flash sensitivity by half, I0(V/N), is 2.76×107 photons·μm-2·s-1. All data are presented in mean±SD. (J) Adaptation relationship of visible (green) and NIR (red) light flash under the visible light background (from C and F) were re-plotted. The discrepancy came from the nonlinearity of upconversion by pbUCNPs (as quantified in FIG. 11B). NIR light flash adaptation relationship (red) was converted to equivalent visible light flash adaptation relationship (violet) according to the pbUCNP upconversion relation fit from FIG. S5B, which matched very well with the visible light flash adaptation relationship curve (green). (K) Representative traces of rod dark current and steady-light current. (L) Differential power spectrum density between dark and light current.

Based on the biocompatibility noted above, it was tested whether the photoreceptors can be activated by NIR light with the help of pbUCNPs. Single rod suction pipette recordings were performed on acutely dissected mouse retinas from pbUCNPs-injected or non-injected mice (FIG. 3A). The action spectra of rods from pbUCNPs-injected and non-injected mice were identical in the visible light range, and their difference only appeared after 900 nm, where the action spectrum of rods from pbUCNPs-injected mice matched the excitation spectrum of pbUCNPs (FIG. 9A). The rods from pbUCNPs-injected mice have normal visible light (535 nm) elicited photocurrents comparing with that of non-injected mice (FIGS. 3B and 3D). The 980-nm light flash could elicit rod photocurrents of the pbUCNPs-injected mice, while rods from non-injected mice had no responses (FIGS. 3C and 3E). The amplitude and kinetics of 980-nm light elicited photocurrents were identical to those activated by 535-nm visible light (FIGS. 3F-3I1). Similar time-to-peak values suggest that, as compared to the visible light stimulation, there is no delay in the activation of the rods by the NIR light. Furthermore, pbUCNPs did not alter the light adaptation and dark noise characteristics of rods, and rods adapt to visible and NIR light in the same manner following Weber-Fechner relation (ref) (FIG. 10).

To determine whether the pbUCNPs can serve as an NIR nanosensor in vivo, the population response of photoreceptors activated by light was recorded via electroretinogram (ERG). (Dalke, et al. 2004 *Invest Ophth Vis Sci* 45, 601-609.) (FIG. 3I). Upon 980-nm NIR light illumination to the eye, the ERG from pbUCNPs-injected mice resembled that of visible light-induced responses, whereas no such signal could be detected from the non-injected control mice. Furthermore, ERG recordings were performed on pbUCNPs-injected rod-functionless mice (Gnat1−/−) and demonstrated that through pbUCNPs, 980-nm NIR light indeed activated cones in vivo (FIG. 9B).

NIR Light Sensation of pbUCNPs-Injected Mice

Figure 4:
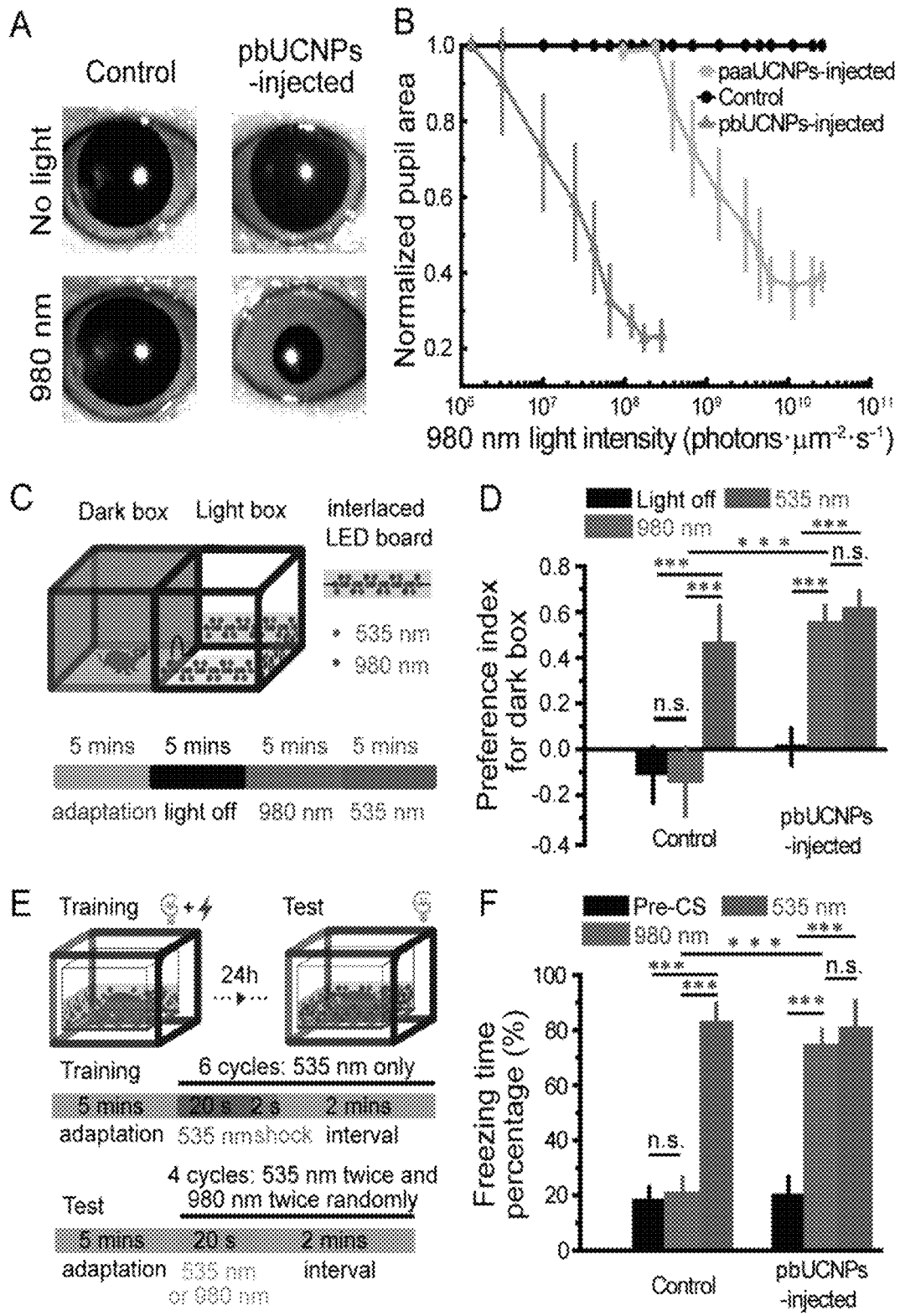
FIG. 4. NIR light sensation of pbUCNPs-injected mice. (A) Images showing pupil constriction from non-injected control and pbUCNPs-injected mice under 980-nm light stimulation (40 s). Intensity of 980 nm light: $1.21 \times 10^8$ photons·µm$^{-2}$·s$^{-1}$. (B) Dose response curves of normalized pupil constriction with 980-nm light stimulation (paaUCNP-injected mice, N=4; pbUCNP-injected mice, N=5; control mice, N=4; data are presented as means±SD). (C) The light-dark box experiment diagram. The light box was illuminated with an array of LED lights interlaced by 980-nm and 535-nm LEDs. The illumination protocol is shown at the bottom. Each section contains four episodes and each episode was 5 minutes long. The first 5-mins episode was adaptation in the light-dark box with the ambient light followed by a 5-mins episode in the complete dark. Then 980-nm and 535-nm LEDs were lighted consecutively for the light box for 5 minutes each. (D) Preference index for dark box under three different light box conditions (light off, 980 nm and 535 nm). Preference index=(time spent in dark box−in light box)/(time spent in dark box+in light box). The intensity of the 980-nm light at the center of the light box was $8.1 \times 10^7$ photons·$\mu m^{-2} \cdot s^{-1}$, and the intensity of the 535-nm light was $9.1 \times 10^2$ photons·$\mu m^{-2} \cdot s^{-1}$. Control: N=5, pbUCNPs-injected: N=6; data are presented as means±SD, two-sided t-test, ***p<0.001. (E) The fear-conditioning experiment diagram and protocol. A 535-nm light pulse was paired with a footshock to form the conditioning during training. Then tests were carried out 24 hours later with 980-nm or 535-nm light pulse alone. (F) Percentages of freezing time during 20-s 'Pre-CS', 980-nm and 535-nm light stimulation (Pre-CS': pre-conditional stimulation, a 20-s period of adaptation right before the light stimulation onset). The intensity of the 980-nm and 535-nm light at the center of the box was $1.07 \times 10^8$ and $1.47 \times 10^3$ photons·$\mu m^{-2} \cdot s^{-1}$, respectively. Data are presented as means±SD (control: N=6, pbUCNPs-injected: N=7; two-sided t-test).

To reveal whether pbUCNPs-injected mice are actually able to see NIR light, pupillary light reflex (PLR) experiments were first performed. (Xue, et al. 2011 *Nature* 479, 67-73.) The pupils of the pbUCNPs-injected mice showed strong constrictions upon 980-nm light illumination, whereas the non-injected control mice did not exhibit PLR with the same NIR illumination (FIG. 4A). Moreover, it was discovered that the PLR of pbUCNPs-injected mice was two orders of magnitude more sensitive to the NIR light than that of non-photoreceptor-binding paaUCNPs-injected mice (FIG. 4B). This was likely attributed to the close proximity between the pbUCNPs and their bound photoreceptors.

Figure 11:
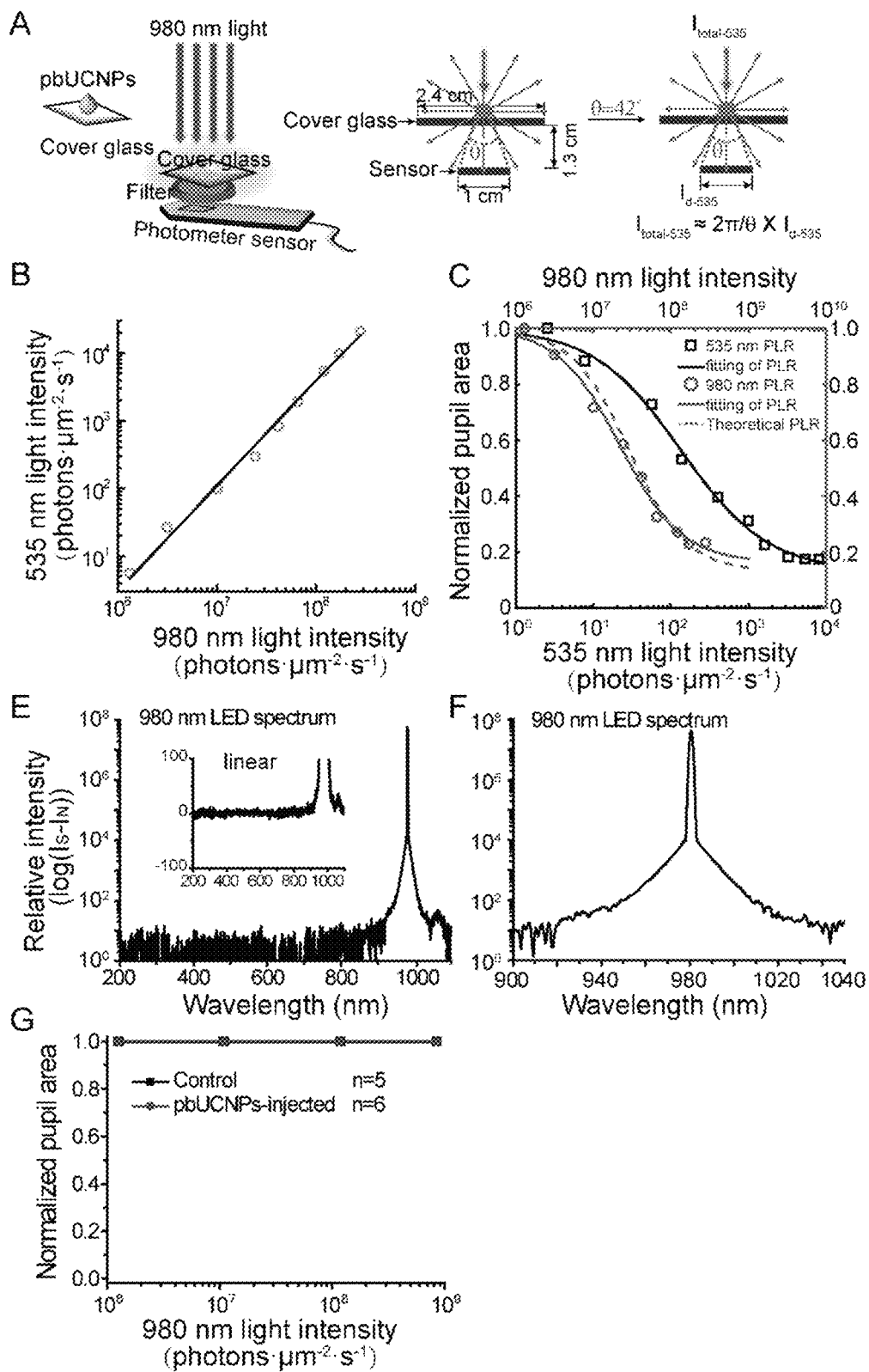
FIG. 11. Demonstration of the nonlinearity of pbUCNP photon upconversion and PLR measured from Gnat1'; cl/cl mice, related to FIG. 4. (A) To calculate the upconversion efficiency of pbUCNPs, pbUCNPs were spread evenly on the surface of a cover glass: 2.4 cm×2.4 cm. 980 nm light was applied from the top of the cover glass covering a 1.5 cm×1.5 cm area and the intensity of emission light from the other side of the cover glass was measured behind a combined filters (bandpass filter at 510 nm-560 nm and shortpass filter cutoff at 805 nm). The numerical aperture of the sensor in the light intensity meter is 0.75, which collected approximately 17% of the isotropically emitted photons from pbUCNPs. (B) The upconversion relationship between NIR and visible light intensities. From a linear fitting in the log-log scale, the power relation was extracted between upconverted 535 nm emissions and 980 nm excitation light to be 1.6. (C) Light induced pupillary light reflex (PLR) dose response curves and their Hill function fitting (markers and solid lines) for both visible (black) and NIR (red) light. A theoretical calculation of NIR light PLR dose response curve (red dashed line) matched very well to the experimental measurement. Therefore, the non-linearity shown in the light induced behavior is attributed to the non-linearity of the upconversion process. (D) Spectrum of 980-nm LED light in log scale. Inset: the expanded view of this spectrum in linear scale. (E) Expanded view of (D) at above 900 nm in log scale. (F) PLR from Gnat1−/−; cl/cl mice, which have intrinsically photosensitive retinal ganglion cells (ipRGCs) as the only functional photoreceptors.

Photon upconversion can be measured (FIG. 11A) and is a non-linear process shown in the light intensity relationship plotted in log-log scale (FIG. 11B). From a linear fit in the log-log scale, the power relation was extracted between emitted 535-nm photons and 980-nm excitation light to be about 1.6. Interestingly, it was found that this non-linearity was also shown in the NIR light induced behavior. The light dose response curves of PLR (the normalized pupil area versus light intensity) were fitted by the Hill function. The NIR light induced PLR dose response curve is steeper compared to that of visible light, and the Hill coefficients for NIR and visible light PLR dose response are fitted to be 1.10 and 0.78, respectively (FIG. 11C). To obtain the theoretical NIR light PLR dose response curve, the fitted upconversion function was applied to visible light PLR dose response Hill function. It was found that this theoretical NIR light PLR dose response curve agreed well with the experimental NIR light PLR response (FIG. 11C). Therefore, the non-linearity shown in the NIR light induced behavior is demonstrated to be attributed to the non-linearity of the upconversion process.

In addition to the above sub-conscious light sensation PLR behavior, light-dark box with visible and NIR lights (FIGS. 4C and 4D) and light-induced fear-conditioning experiments were performed (FIGS. 4E and 4F). In the conventional light-dark box experiments with visible light, mice instinctively preferred the dark box to the light box that was illuminated with visible light. In the study, conventional used visible light was replaced with 980-nm LED light which delivered $8.1 \times 10^7$ photons·μm$^{-2}$·s$^{-1}$ at the center of the light box, equaled to the power density of 1.62 mW/cm$^2$. The pbUCNPs-injected mice were found to exhibit a significant preference for the dark box, whereas the non-injected control mice could not distinguish between the NIR light (980 nm) illuminated and dark boxes (FIG. 4D). This suggests that with the injected nanoantennae mice do perceive NIR light and generate innate light-sensing behavior. To exclude the possibility of any visible light emission from the NIR LEDs, the emission spectrum of the 980-nm LEDs was measured and no light emission below 900 nm was detected (FIGS. 11D and 11E).

Next tested was whether such NIR light perception can serve as a visual cue for learned behavior. In this experiment, mice were trained to pair a 20-s 535-nm light pulse to a 2-s foot shock (FIG. 4E) in order to acquire a conditioned freezing behavior. After acquisition of such conditioning, mice received either NIR light at 980 nm or visible light at 535 nm as conditional stimuli (CS) in the test trials. As a result, the pbUCNPs-injected mice showed significant freezing behavior in response to both wavelengths; whereas the non-injected control mice exhibited freezing behavior only to visible light stimuli (FIG. 4F). The above results clearly demonstrated that mice indeed acquire NIR light sensation and are able to 'see' NIR light with the ocular injectable photoreceptor targeting nanoantennae.

NIR Light Activated Imaging Visual Pathway of pbUCNPs-Injected Mice

Figure 5:
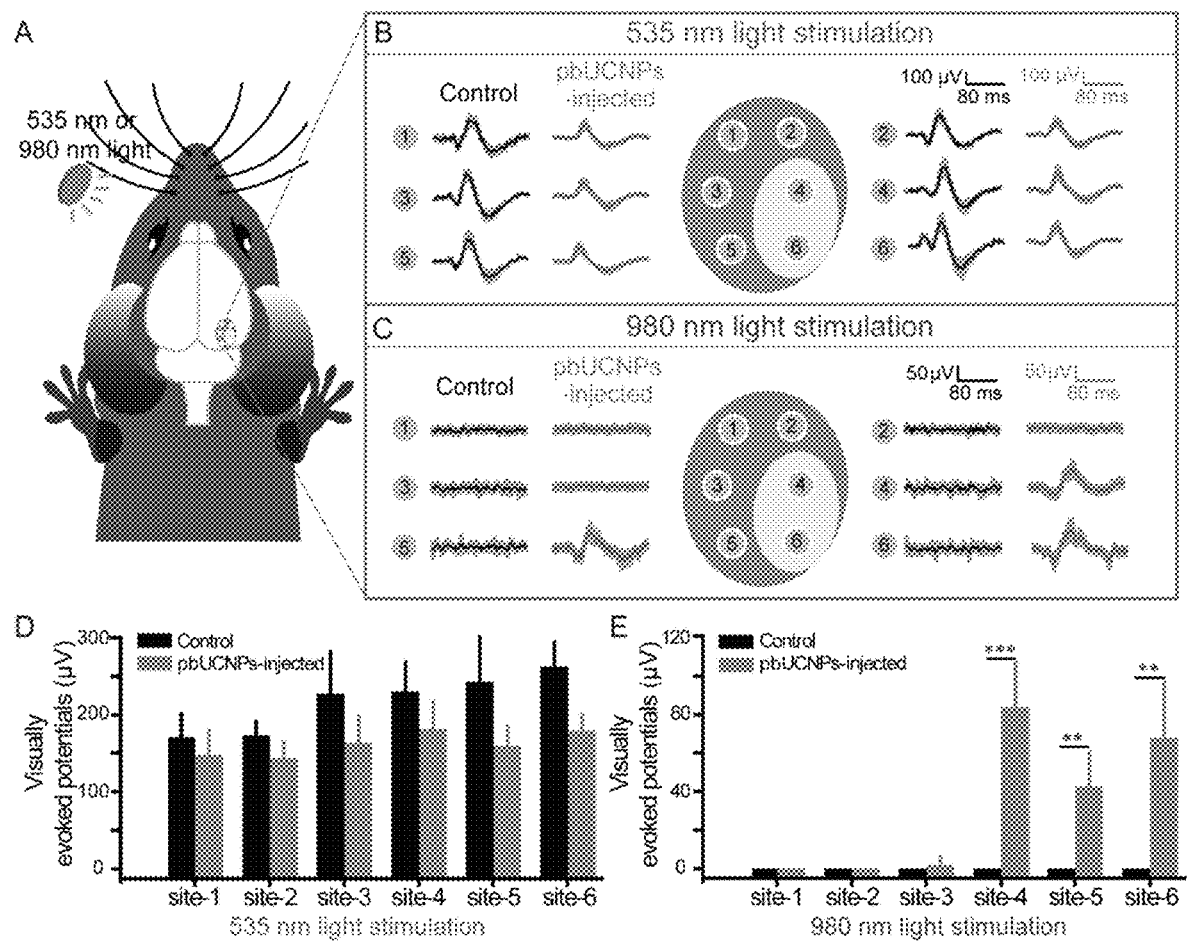
FIG. 5. NIR light activated the imaging visual pathway of pbUCNPs-injected mice. (A) Diagram of six recording sites for visually evoked potential (VEP) in the mouse visual cortex. (B) VEPs of non-injected control (black traces) and pbUCNPs-injected mice (grey traces) under 535-nm light illumination. Intensity of the 535-nm light was $3.37 \times 10^3$ photons·$\mu m^{-2} \cdot s^{-1}$. The recording sites 1, 2, 3 and 5 were monocular areas; and 4, 6 were binocular areas. Traces were averaged from 6 sweeps and presented as mean±SD (shaded area). (C) VEPs of control (black traces) and pbUCNPs-injected mice (grey traces) under 980-nm light illumination. Intensity of the 980-nm light was $7.07 \times 10^8$ photons·$\mu m^{-2} \cdot s^{-1}$. (D, E) Peak VEPs triggered by 535-nm or 980-nm light at each recording site (mean±SD, N=4 for both, two-sided t-test, p<0.01, *p<0.001).

In addition to the NIR light sensation, it is important to know whether pbUCNPs-injected mice acquired NIR light image visual ability. In general, image visual perception is associated with the activation of the visual cortex. In order to record visually evoked potential (VEPs), recording electrodes were placed in six different locations of the visual cortex (No. 1, 2, 3, and 5 in the monocular areas and No. 4 and 6 in the binocular areas) during contralateral eye illumination. (Cooke et al. 2015 *Nat Neurosci* 18, 926-926; Smith, et al. 2007 *Nat Neurosci* 10, 370-375.) (FIG. 5A). When the visible 535-nm light pulse was applied, VEPs were detected at all of the locations in both the non-injected control and pbUCNPs-injected mice (FIGS. 5B and 5D). In contrast, under 980-nm NIR light illumination, no VEPs were observed in the control mice, while VEPs could be detected from the binocular visual cortical areas in the pbUCNPs-injected mice (FIGS. 5C and 5E). This is topologically consistent with the pbUCNPs injection site (the temporal side, binocular projection area) in the retina.

NIR Light Pattern Vision

Figure 6:
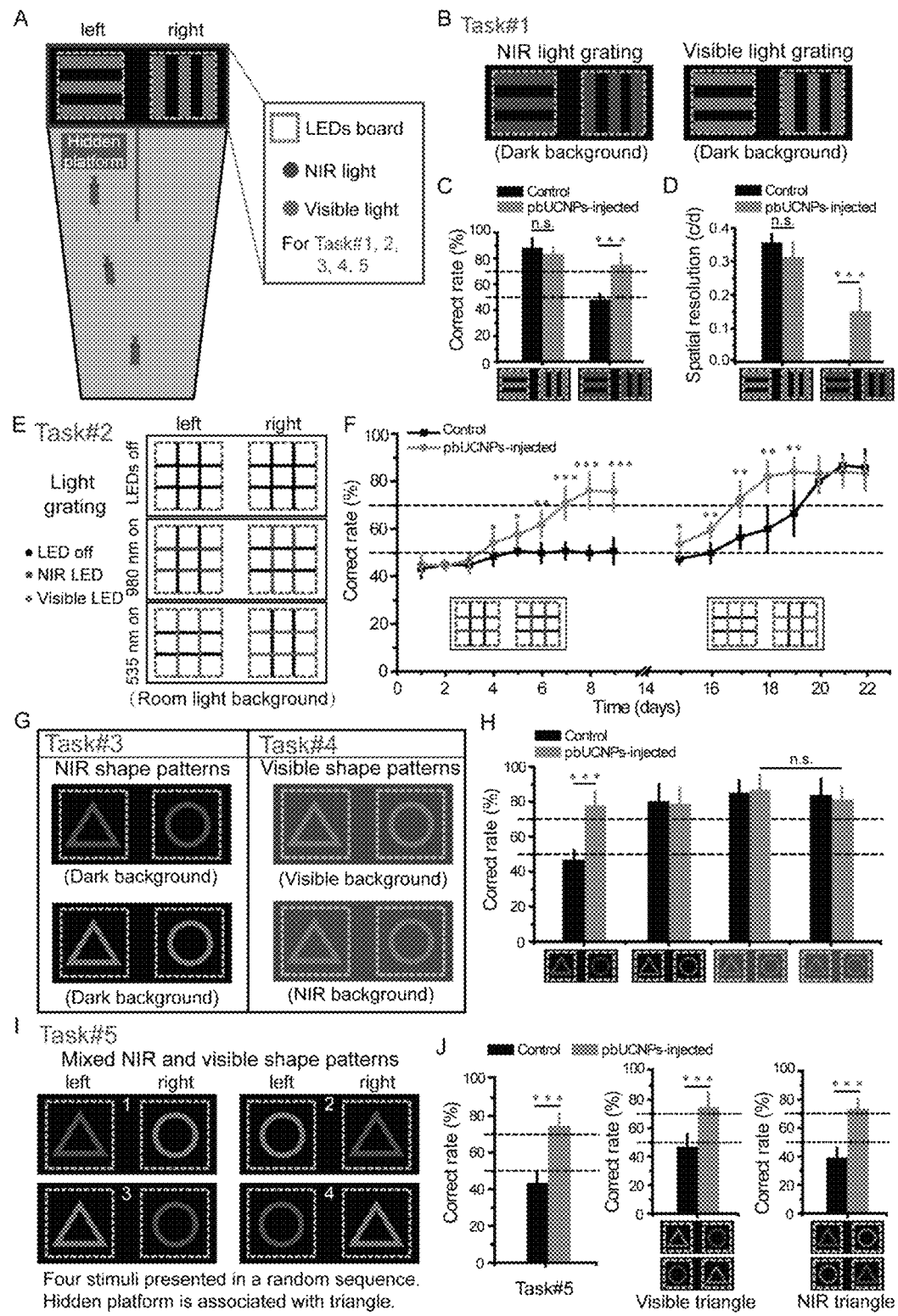
FIG. 6. NIR light pattern vision of pbUCNPs-injected mice. (A) The diagram of the Y-shaped water maze for Task #1-5. (B) The stimuli of Task #1. Experiments were under dark background. (C) Correct rates of Task #1 for light gratings discrimination (pbUCNPs-injected mice: N=7; non-injected control mice: N=6). (D) Visual spatial resolutions of the pbUCNPs-injected and control mice for 535-nm and 980-nm light gratings. (E) The diagram of visual stimuli in the Task #2. Light grating stimulations were made of LED arrays with ambient room light as background. (F) Correct rates of Task #2 with respect to the discrimination the 980-nm (Day 1-9) and 535-nm (Day 15-22) light LED gratings in room light background (pbUCNPs-injected mice: N=7 and control mice: N=5). (G) Diagrams of Task #3 and #4. Triangle and circle patterns were made of LEDs and presented at the end of the water maze. (H) Correct rates of Task #3 & 4 of discriminating triangle and circle patterns in dark, visible light or NIR light background (pbUCNPs-injected: N=5 and control: N=6). (I) The diagram of the four stimuli in Task #5. The four stimuli were mixed and shuffled randomly in position. (J) Correct rates of Task #5 of discriminating NIR and visible light shape patterns simultaneously (left), with the triangle pattern in visible light (middle) and with the triangle pattern in NIR light (right) (pbUCNPs-injected: N=5 and Control: N=6).
Figure 12:
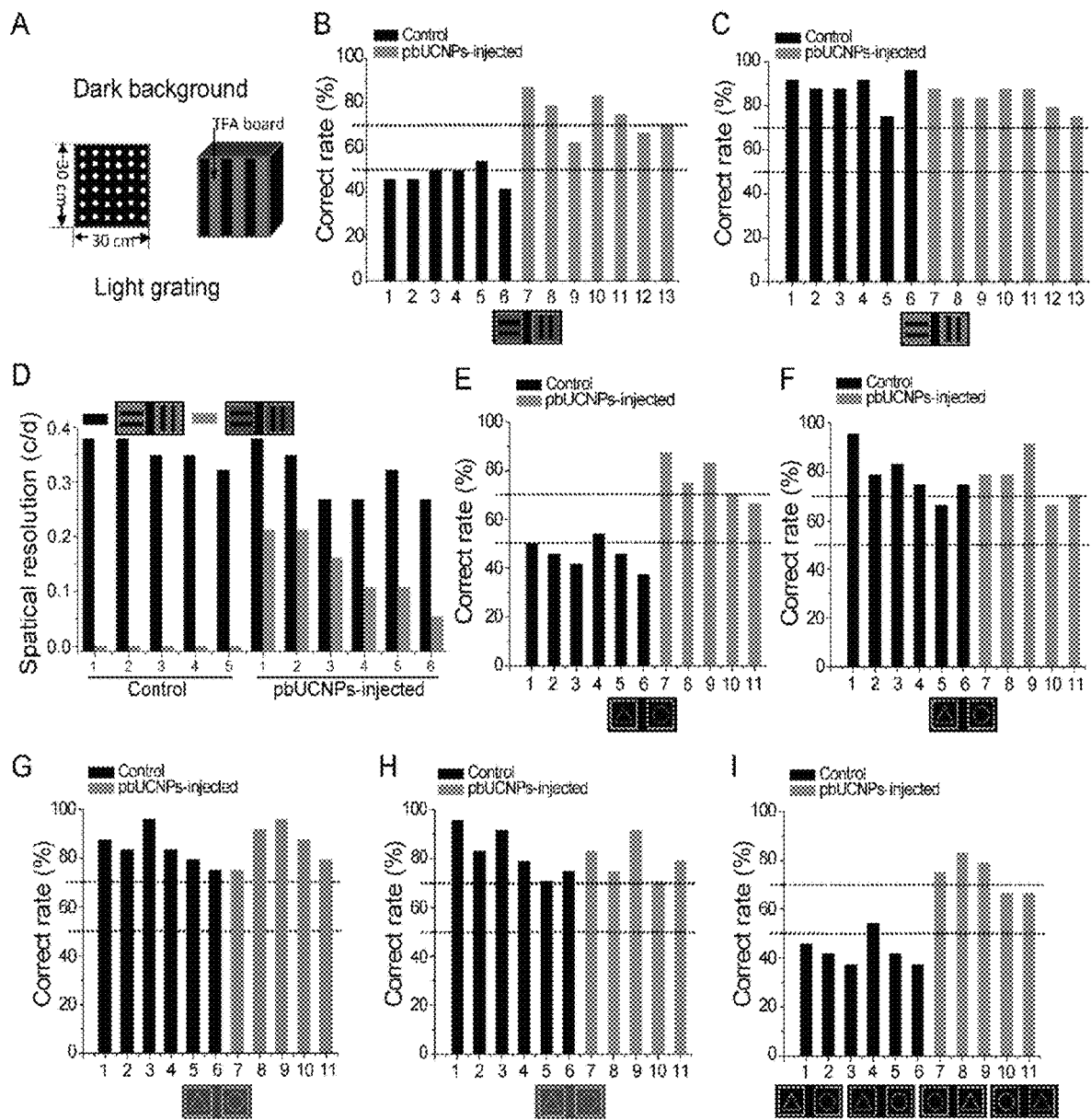
FIG. 12. Simultaneous NIR and visible light pattern vision, related to FIG. 6. (A) Diagram of the light grating stimuli made from LED arrays and transparent acrylic (TFA) boards. (B) Correct rates made by each individual animal in discriminating NIR light gratings. (C) Correct rates made by each individual animal in discriminating visible light gratings. (D) The visual imaging resolution for each individual animal for visible (dark) and NIR (grey) light gratings. (E) Correct rates made by each individual animal in discriminating NIR light triangle and circle in dark background. (F) Correct rates made by each individual animal in discriminating visible light triangle and circle in dark background. (G) Correct rates made by each individual animal in discriminating visible light triangle and circle in visible light background. (H) Correct rates made by each individual animal in discriminating visible light triangle and circle in NIR light background. (I) Correct rates made by each individual animal in discriminating NIR and visible light triangle and circle simultaneously.

Next examined was whether mice obtained NIR light pattern vision. Accordingly, Y-shaped water maze behavior experiments were conducted to determine whether mice could discriminate between different light patterns. (Prusky, et al. 2000 *Vision Research* 40, 2201-2209.) (FIG. 6A). The mice were trained to find a hidden platform that was associated with one of the two patterns. Five different tasks were designed in order to examine their NIR pattern vision ability in regard to different pattern stimuli and various background light conditions. The Task #1 was to use light gratings as pattern stimuli (FIGS. 6B and 12A). After training with the 980-nm light gratings, the pbUCNPs-injected mice were able to discriminate between the two orientations (vertical or horizontal) of NIR light gratings, whereas the non-injected control mice made such choices in a random manner (FIG. 6C). In the parallel control testing, when the mice were trained and tested with visible light gratings, both the pbUCNPs-injected and non-injected mice were able to find the associated platform (FIGS. 6C, 12B and 12C). The spatial resolution of the NIR image perception was then measured. The pbUCNPs-injected mice were found to detect the visible light gratings with a maximum spatial frequency of 0.31±0.04 cycles/degree, which did not significantly differ from that of the non-injected control mice (0.35±0.02 cycles/degree). This indicates that the sub-retinal injection of pbUCNPs did not interfere with visible light vision. With respect to NIR light gratings, the pbUCNPs-injected mice detected a maximum of 0.14±0.06 cycles/degree, and this decrease of spatial resolution in NIR light vision may be due to the isotropic radiation and scattering of the in situ transduced visible light from the NIR light-excited pbUCNPs (FIGS. 6D and 12D).

In addition, in order to confirm if visible light background interferes with such NIR light pattern perception, Task #2 was designed using two LED boards with visible (535 nm) and NIR (980 nm) LED arrays, which were arranged in a perpendicular manner on each board. These two boards actually appeared to be identical under ambient visible light background when all of these LEDs (visible and NIR) were turned off. The orientation for the 535-nm and 980-nm LEDs stripes between the two boards were 90 degrees rotated respectively (FIG. 6E). Trainings were carried out under visible room light (196 lux) and only with the 980-nm LEDs on. In the tests, only pbUCNPs-injected mice were found to be able to learn to locate the platform (FIG. 6F), indicating that the NIR light pattern vision persisted in the visible light illuminated environment.

More interestingly, in this study, these mice were subsequently tested with the 535-nm LEDs on and the 980-nm LEDs off. Both pbUCNPs-injected and control mice were able to discriminate the visible light gratings, again indicating pbUCNPs injection did not affect the normal visible light vision. Additionally, pbUCNPs-injected mice could discriminate the visible light gratings from the beginning of the test, suggesting that pbUCNPs-injected mice were able to implement the rule learnt from the NIR light pattern to visible light pattern discrimination, which indicated that NIR light patterns did not perceptually differ from visible light patterns for pbUCNPs-injected mice (FIG. 6F).

To test more sophisticated pattern vision, animals were further prompted to discriminate triangular and circular patterns in the Task #3 (FIG. 6G). As a matter of fact, it was found that pbUCNPs-injected mice were able to discriminate NIR and visible light patterns in the dark environment while the non-injected control mice could only detect visible light pattern (FIGS. 6H, 12E and 12F), indicating that the pbUCNPs-injected mice were able to see sophisticated NIR light patterns. To investigate whether background NIR light would interfere with the visible light pattern vision for pbUCNPs-injected mice, Task #4 was designed, where mice were tested to discriminate between visible light triangles and circles in visible or NIR light background (FIG. 6G). Same as control mice, the pbUCNPs-injected mice did not behave differently in regard to their ability to discriminate visible light patterns with dark, visible or NIR light background (FIGS. 6H, 12F, 12G and 12H). These results clearly suggested that background NIR light would not interfere with the visible light pattern perception.

Furthermore, Task #5 was designed to test whether pbUCNPs-injected mice could see NIR and visible light patterns simultaneously. In general, saturation by visible light is a common problem for conventional used devices such as optoelectronic night vision devices or an IR camera, as it prevents the occurrence of smooth detection between visible and NIR light objects. In order to test if the built-in NIR light vision could overcome this problem and coexist with visible light vision, the following experiments were designed. Mice were first trained in a Y-shaped water maze with visible light triangular and circular patterns to learn the platform was associated with the triangles only.

During the test trials, one visible (535 nm) and one NIR (980 nm) light pattern of triangle/circle were presented at the left/right ends of the water maze, shuffled in a random sequence (FIG. 6I). it was found that only the pbUCNPs-injected mice were able to discriminate between the two patterns with different shapes and wavelengths (FIGS. 6J, left and 12I). To exclude the possibility that mice simply use either visible or NIR light pattern to guide decision rather than seeing them simultaneously, the correct choice rates were calculated separately for visible light triangle patterns and NIR light triangle patterns. When the triangle pattern was in visible light, control mice picked the side randomly indicating they could not simply use the visible triangle only to make decisions (FIG. 6J, middle), while they can discriminate when both patterns were presented at the end of the water maze in visible light (FIG. 6I). When the circle pattern was in visible light, control mice still picked the side randomly indicating mice could not use the strategy of avoiding circle patterns to make decisions (FIG. 6J, right). In contrast, pbUCNPs-injected mice made correct choices in both cases suggesting they must have used visible and NIR light patterns together to guide their behavior. These results clearly indicated that the built-in nanoantennae indeed enable mice to see visible and NIR light patterns simultaneously.

In this study, it was demonstrated the successful application of UCNPs as ocular injectable NIR light transducers that allowed for the extension of mammalian vision in the NIR realm. Such implanted nanoantennae are proven to be biocompatible and not interfere with normal visible light vision. Most importantly, animals were found to be able to detect the NIR light images simultaneously with visible light images.

Image Vision Spectrum Extends to the NIR Range

One way to obtain NIR light vision is to implement completely new machinery for NIR photon transduction, such as the thermal detection of snakes. (Gracheva, et al. 2010 *Nature* 464, 1006-U1066.) However, the more plausible method is to achieve such NIR photon detection by the use of the endogenous visual system. The method disclosed here utilizes the very first step of the image visual perception process through this photoreceptor outer segment binding NIR nanoantennae. The NIR light image was projected to the retina through the optical part of the eyes, the cornea and lens, and then the pbUCNPs upconverted NIR light into visible light, activating their bound photoreceptors. Subsequently, the retinal circuit and cortical visual system will generate perception of the NIR image.

It is important to note that these injected nanoantannnae did not interfere with the animals' natural visible light vision. The ability to simultaneously detect visible and NIR light patterns suggests an enhanced mammalian visual performance by extending the native visual spectrum without genetic modifications and avoiding the need for the conventional bulky external devices. This approach offers several advantages over the currently used optoelectronic devices, such as no need for any external energy supply, and it is stealthy, as well as being compatible with other human activities.

Improved Efficiency Through ConA Modification of UCNPs

In regard to the practical applications of such UCNPs, higher image visual sensitivity and resolution are quite desirable. UCNPs were modified and such photoreceptor binding nanoparticles were generated in order to increase the proximity between the nanoparticles and photoreceptors. Thus, the sensitivity to NIR light with respect to generating light-induced behaviors was improved by 2 orders of magnitude. Therefore, it is now possible to use biocompatible low power NIR LEDs to elicit animal visual behavior, rather than the more invasive high power NIR laser that is inevitably used in conventional UCNPs biomedical applications. (Chen, et al. 2018 *Science* 359, 679-683; He, et al. 2015 *Chem Commun* 51, 431-434.) We estimated that in the Y-shaped water maze experiment, the 980 nm LED light were transduced to 535 nm light by pbUCNPs with 293 photons·μm-2·s-1 intensity at the retina. Since the visual behavior threshold of mice is approximately 0.012 photons·μm-2·s-1 at the corneal, this is equal to 0.003 photons·μm-2·s-1 at the photoreceptor layer. (Sampath, et al. 2005 *Neuron* 46, 413-420; Do, et al. 2009 *Nature* 457, 281-U282.)

herefore, in our system, 293 photons·$\mu m^{-2} \cdot s^{-1}$ is adequate to activate both rod and cone photoreceptors, and in practice, this NIR visual system is even able to detect NIR light that is of several magnitudes lower intensity. (Sampath, et al. 2005 *Neuron* 46, 413-420.) Other than rods, cones encode several orders of magnitude higher intensity of light, and more important for human high acuity image vision, therefore pbUCNPs-binded cones could mediate high resolution NIR image pattern vision. Retina has the third photoreceptor, intrinsic photosensitive retinal ganglion cells (ipRGCs), which mediate non-image forming vision functions, such as photoentrainement of circadian rhythm. It was found that NIR light with the intensity used in the behavior experiment did not activate ipRGCs (FIG. 11F). This result is likely due to ipRGCs' longer distance to pbUCNPs and their related low sensitivity. (Do, et al. 2009 *Nature* 457, 281-U282.) With respect to NIR image spatial resolution, pbUCNPs-injected mice had fairly good NIR eye sight (0.14±0.06 cycles/degree, half of the visible image resolution), allowing them to see sophisticated NIR light patterns.

Biocompatible NIR Nanoantennaes ub-retinal injection in humans is a common practice in ophthalmological treatment (Hauswirth, et al. 2008 *Hum Gene Ther* 19, 979-990; Peng, et al. 2017 *Ophthalmic Res* 58, 217-226.) The implantation of microscale sub-retinal devices is a potential method of repairing vision following retinal photoreceptor degeneration, however these devices may lead to biocompatibility issue, such as retinal detachment, fibrosis and inflammation. (Zrenner 2013 *Sci Transl Med* 5.) Yet, this did not occur in our system, as the intimate contact between the pbUCNPs and photoreceptors did not cause any separation between the photoreceptors and RPE, the latter of which is the supporting layer for photoreceptors. As a result, neither inflammation nor apoptosis occurred, which is in line with that of another reported retinal application of rare earth nanoparticles. (Chen, et al. 2006 *Nat Nanotechnol* 1, 142-150.) The stability and compatibility of pbUCNPs is also demonstrated by the success of detecting NIR light images even after 10 weeks without the need of any repeated injections.

he disclosed materials and methods will not only provide potential solutions that are closely integrated within the human body to extend the visual spectrum, it will also open new opportunities to probe a wide variety of animal vision related behaviors in such research. Furthermore, it has considerable potential in numerous areas of emerging interest with respect to the development of bio-integrated nanodevices in civilian encryption, security, military operations and human-device interface that require the ability of NIR light image detection that goes beyond the normal functions of mammals. Moreover, other than the potential translational applications to humans, these "super" mice with the NIR visual ability that have been developed can be employed to execute tasks in numerous hazardous and risky conditions that human beings cannot be involved in.

Experimental

General Chemicals $Y_2O_3$ (99.9%), $Yb_2O_3$ (99.9%), $Er_2O_3$ (99.9%), $CF_3COONa$ (99.9%), $CF_3COOH$, 1-octadecene, oleic acid, oleylamine, and other organic solvent were purchased from Sigma-Aldrich and used directly without further purification. Lanthanide trifluoroactates, $Ln(CF_3COO)_3$ were prepared according to literature method (Roberts 1961 *J Am Chem Soc* 83, 1087).

Synthesis of β-NaYF$_4$:20% Yb, 2% Er Core

The l3-NaYF$_4$:20% Yb, 2% Er core UCNPs were prepared by a modified two-step thermolysis method (Mai et al., 2006). In the first step, $CF_3COONa$ (0.5 mmol) and Ln $(CF_3COO)_3$ ((Y+Yb+Er) 0.5 mmol in total, Y:Yb:Er=78%: 20%:2%) precursors were mixed with oleic acid (5 mmol), oleyamine (5 mmol) and 1-octadecene (10 mmol) in a two-neck reaction flask. The slurry mixture was heated to 110° C. to form a transparent solution followed by 10 minutes of degassing. Then the flask was heated to 300° C. with a rate of 15° C./min under dry argon flow, and it maintained at 300° C. for 30 minutes. The α-NaYF$_4$:Ln intermediate UCNPs were gathered from the cooled reaction solution by centrifugal washing with excessive ethanol (7500 RCF, 30 min). In the second step, the α-NaYF$_4$:Ln intermediate UCNPs were re-dispersed into oleic acid (10 mmol) and 1-octadecene (10 mmol) together with $CF_3COONa$ (0.5 mmol) in a new two-neck flask. After degassing at 110° C. for 10 minutes, this flask was heated to 325° C. with a rate of 15° C./min under dry argon flow, and remained at 325° C. for 30 minutes. Then, β-NaYF$_4$:Ln UCNPs were centrifugally separated from the cooled reaction media and preserved in hexane (10 mL) as stock solution.

Synthesis of β-NaYF$_4$:20% Yb, 2% Er@β-NaYF4 Core/Shell UCNPs

In this thermolysis reaction, as-synthesized-NaYF$_4$:20% Yb, 2% Er UCNPs served as cores for the epitaxial growth of undoped-NaYF$_4$ shells. Typically, a stock solution of β-NaYF$_4$: 20% Yb, 2% Er UCNPs (5 mL, ca. 1 μmol/L core UCNPs) was transferred into a two-neck flask and hexane was sequentially removed by heating. $CF_3COONa$ (0.5 mmol) and $Y(CF_3COO)_3$ (0.5 mmol) were added along with oleic acid (10 mmol) and 1-octadecene (10 mmol). After 10 minutes of degassing at 110° C., the flask was heated to 325° C. at a rate of 15° C./min under dry argon flow and was kept at 325° C. for 30 minutes. The products were precipitated by adding 20 mL ethanol to the cooled reaction flask. After centrifugal washing with hexane/ethanol (7500 RCF, 30 min), the core/shell UCNPs were re-dispersed in 10 mL of hexane.

Synthesis of pbUCNPs

As synthesized β-NaYF$_4$:20% Yb, 2% Er@β-NaYF$_4$UCNPs were first treated by surface ligand exchange using a modified literature method (Dong et al., 2011). Generally, nitrosonium tetrafluoroborte/DMF solution (0.2 g NOBF$_4$, 5 mL DMF) was added into 1 mL UCNPs hexane stock solution, followed by 4 mL hexane and 3 hours of stirring at room temperature. Then oleic acid free UCNPs were precipitated by adding 5 mL isopropanol and purified by centrifugal wash with DMF. UCNPs solids were re-dispersed in poly (acrylic acid)/DMF (10 mg/mL, 5 mL) solution to coated UCNPs surface with PAA. After overnight stirring, PAA coated UCNPs (paaUCNPs) were purified by centrifugal and wash with DI-water. Then ConA proteins were conjugated to paaUCNPs surface by traditional EDC/NHS coupling. Generally, 10 mg paaUCNPs in 1 mL DI-water were treated with 1 μL EDC/NHS water solution (1 g/L). After stirring at room temperature for 1 hour, 30 μL ConA solution was introduced (5 g/L) and the mixture was further stirred overnight. The pbUCNPs were purified by washing with deionized water, centrifugation and dispersed in water for further use.

Sub-Retinal Injection

For sub-retinal injection, pupils were dialyzed with atropine (100 μg/mL, Sigma-Aldrich), and animals were anesthetized by Avertin (450 mg/kg, Sigma-Aldrich). A 33 Gauge needle was inserted through the cornea to release the intra-ocular pressure. 25 mg/mL nanoparticles was dissolved in 1.5 μL autoclaved PBS and this solution was then injected into the sub-retinal space through a beveled, 34-gauge hypodermic needle (Hamilton, Switzerland). During and after the injection the animal was kept on a warming blanket and eyes were kept wet to avoid cataract.

Sub-Retinal Distribution of Nanoparticles and Potential Toxicity Analysis

To observe the distribution of nanoparticles in the sub-retinal space, fresh retinas were separated from eyes, then fixed in 4% paraformaldehyde (PFA), frozen and cut into 20 μm slices with Leica CM3050 S Cryostat (Leica, Germany) (FIG. 1I). The paaUCNPs-injected retina in supplementary FIG. 7B, were freshly separated from eyes under anhydrous operation to avoid nanoparticles diffusing into the solution, then only frozen and cut into 20 μm slices. All retina slices were scanned by Leica two-photon microscope. The emission spectrum was obtained by exciting nanoparticles with a 980 nm laser beam and collecting the emitted light with a photomultiplier behind a light grating slit with 10 nm wavelength step from 435 nm to 790 nm (SP8, Leica, Germany). Data was acquired with Leica software and analyzed with Origin 8.0 (Origin Lab Corp).

To analyze whether nanoparticles are potentially toxic to retina, we injected nanoparticles in different concentrations and then performed hematoxylin-eosin (HE) staining on fixed retinal slices. (Burstyn-Cohen, et al. 2012 *Neuron* 76, 1123-1132.) Cell bodies of photoreceptors were located in the outer nucleus layer (ONL) and we counted the number of cell layers as a parameter to evaluate the damage. The number of cell layers were counted at 5 different locations of injection sites from 5 random different slices of each retina and then averaged.

TUNEL Apoptosis Detection

We detect photoreceptors apoptosis using TUNEL (Terminal deoxynucleotidyl transferase dUTP nick end labeling) Apoptosis detection kit (Vazyme Biotech Co., Ltd-A113). Before TUNEL staining, retinas slices were washed twice by PBS solution and then incubated in 1% Triton X-100 (Sangon-A110694) solution for 2-3 hours. Afterwards retinal slices were equilibrated in equilibration buffer (provided in the kit) for 10-30 mins and then incubated in TdT incubation buffer for 60 mins. Finally, retinal slices were incubated in DAPI-PBS solution for 5 mins and then after washed 3 times by PBS solution. All retina slices were scanned by Leica two-photon microscope to detect TUNEL signals. The number of positive cells were counted at 6 different locations of injection site from each retina and then averaged.

Microglia Staining

To detect immune reactions in nanoparticles injected retinas, we implemented Iba1 (ionized calcium binding adapter molecule 1, one marker protein of microglia) staining assay. Retinal slices were washed twice by PBS solution and then blocked in 1% Triton X-100 (Sangon-A110694) and 5% goat serum solution (blocking solution) for 2-3 hours. Then slices were incubated in blocking solution with rabbit anti-Iba1 antibody (Wako-019-19741, 1:1000) at 4° C. overnight. Afterwards, slices were washed 3 times by PBS solution, and then incubated in Alexa Fluor™ 568 goat anti-rabbit IgG (H+L) secondary antibody (Thermo Fisher Scientific-1832035, 1:800) at room temperature for 2-3 hours. Finally, retinas slices were incubated in DAPI-PBS solution for 5 mins and then washed 3 times by PBS solution. All retina slices were scanned by Leica two-photon microscope to analyze retinas immune activities. The number of positive cells were counted at 6 different locations of injection site from each retina and then averaged.

Single Cell Electrophysiology 1 mg agarose (Sigma-Aldrich) was added into 33.3 μL (300 mg/mL) UCNPs phosphate buffer saline (PBS) solution. The well-mixed solution was heated in 75° C. water bath to make sure the mixed solution was homogeneous. Then, the mixed solution was quickly sucked into a plastic tube with 4.5 mm inner diameter. The tube was cooled immediately by ice bathing until agarose became solid. A ~4 mm diameter and ~1.3 mm thick nanoparticle-disk was cut off.

Before rod suction pipette recordings, mice were dark-adapted overnight. Animals were anesthetized with Tribromoethanol (Avertin, 450 mg/kg, Sigma-Aldrich) and eyes were enucleated before euthanasia. Retina was carefully isolated from the eye and flat-mounted onto a nanoparticle disk. Recordings were carried out on an Olympus upright infrared-DIC microscope. The extracellular bath solution was bicarbonate-buffered Ames medium (in mM): 120 NaCl, 22.6 NaHCO$_3$, 3.1 KCl, 0.5 KH$_2$PO$_4$, 1.5 CaCl$_2$), 1.2 MgSO$_4$, 6 Glucose, equilibrated with 5% CO$^2$/95% O$^2$ and heated to 35° C. (Warner Instruments Corp, TC-3448). The perfusion speed was ~5 ml/min through the 3-ml recording chamber. The outer segment of a rod was gently sucked into a 1 μm diameter glass pipette filled with modified Ames solution (in mM): 135 NaCl, 10 mM HEPES, 3.1 KCl, 0.5 KH$_2$PO$_4$, 1.5 CaCl$_2$), 1.2 MgSO$_4$, 6 Glucose, pH adjusted to 7.4 by NaOH. Stimulation light was applied through the imaging objective. 535 nm light was from a filter block in front of a white light LED. Infrared light was generated by 980 nm laser. Light intensity in FIG. 3B: 535 nm-0.32, 0.82, 1.65, 5.68, 15.08, 25.89, 54.49, 105.58; 980 nm-1.79×10$^6$, 4.11×10$^6$, 1.07×10$^7$, 3.12×10$^7$, 1.52×10$^8$, 3.50×10$^8$, 6.00× 10$^8$; unit-photons·μm$^{-2}$.

Data were lowpass filtered at 50 Hz and sampled at 25 kHz by Axon 700B Amplifier and Digital 1440A interface. Data were analyzed with custom routines in Origin 8.0 and presented as mean±SD.

Electroretinography

Mice were anesthetized by Avertin (450 mg/kg, Sigma-Aldrich) and pupils were dialyzed with atropine (100 μg/mL, Sigma-Aldrich). During the experiment, an animal was kept on a warming blanket and eyes were kept wet to avoid cataract (Dalke, et al. 2004 *Invest Ophth Vis Sci* 45, 601-609). Mice were placed into a Faraday cage and a glass recording electrode with a tip diameter of 10 μm was put tightly against the center of the cornea. A ground electrode was inserted into subcutaneous space of the tail and a reference electrode was inserted into subcutaneous space of the head. A 535 nm LED light (3.37×10$^3$ photons·μm$^{-2}$·s$^{-1}$) and a 980 nm laser beam with a spot diameter of 1.8 mm (7.07×10$^8$ photons·μm$^{-2}$·s$^{-1}$) was (delivered to the pupil) placed in front of the eye for stimulation. Data acquisition was carried out by a differential amplifier (AM-SYSTEM INC) and Digital 1440A (Axon CNS). Data were analyzed with custom routines in Origin 8.0 (Origin Lab Corp). ERG was carried out 2-3 weeks after pbUCNPs injection.

Pupillary Light Reflex

Head-fixed mice were used for pupillometry of long-duration measurements (Xue, et al. 2011 *Nature* 479, 67-73). C57BL6 wild type mice were anesthetized with intraperitoneal injection of Avertin. A patch of skin overlying the skull was excised, and four bone screws were threaded into the skull, with care taken to prevent any damage to the brain. These screws were covered with dental cement, and served as the foundation for a stainless-steel post. Under anesthesia, eyes were kept wet with eye gel (5% Sodium carboxymethyl cellulose in PBS, Sigma-Aldrich) to avoid cataract. Mice were kept in 12/12 hours light/dark cycles. All PLR experiments were performed during the day: from 2 hours after light-on to 2 hours before light-off with >1 hr dark adaptation. To measure the PLR of the pbUCNPs-injected eye, we built a pupillometer with a miniature, infrared CCD camera and 850 nm LED light for video recording via a Ganzfeld sphere. A laser beam with a spot diameter of 1.8 mm was placed 1 mm away in front of the injected eye. Light intensity of 980 nm light in FIG. 3H: Control and paaUCNPs injected—9.49×10', 2.36×10$^8$, 3.80×10$^8$, 6.67×10$^8$, 1.42× 10$^9$, 2.97×10$^9$, 4.44×10$^9$, 6.06×10$^9$, 1.13×10$^{10}$, 1.97×10$^{10}$, 2.56×10$^{10}$; pbUCNPs injected—1.33×10$^6$, 3.15×10$^6$, 1.01× 10$^7$, 2.44×10$^7$, 4.18×10$^7$, 6.54×10$^7$, 1.21×10$^8$, 1.72×10$^8$, 2.80×10$^8$; unit-photons·μm$^{-2}$·s$^{-1}$ Videos for contralateral eyes were recorded at a frame rate of 5 Hz. A data-acquisition board (NI USB-6211, National Instruments) and custom written software were used for triggering recordings and light stimulations. Videos were recorded and analyzed with XCAP-Ltd V3.x. The normalized pupil area was calculated by normalizing the area measured at maximum constriction during the 40 s light stimulation to that before light stimulation. We measured PLR of injected mice 2-3 weeks after injection.

Fitting of the PLR

To calculate the upconversion efficiency of pbUCNPs, pbUCNPs were spread evenly on the surface of a cover glass: 2.4 cm×2.4 cm. We applied such an amount of pbUCNPs in order to keep the surface density of pbUCNPs on the cover glass the same as that in the retina. The filter in front of the detection window was bandpass filter at 510 nm-560 nm (Thorlabs). 980-nm light was applied from the top of the cover glass and the intensity of emission light was measured from the other side of the cover glass. This relationship was fitted by a linear function in the log-log scale. The dose response curve of PLR—the normalized pupil area versus light intensity—was fitted by the Hill function. The Hill coefficient for NIR and visible light PLR dose response is fitted to be 1.10 and 0.78, respectively. To calculate the theoretical NIR light PLR dose response curve, NIR light intensities were applied to the upconversion relationship to generate upconverted corresponding visible light intensities, and then these intensities were applied to visible light PLR dose response Hill function. The fitting procedure was carried by a custom written script in Matlab (Mathworks, USA).

Light-Dark Box

Mice were placed in a 59 cm×28.5 cm×28.5 cm custom-made light and dark double box (Bourin, et al. 2003 *Eur J Pharmacol* 463, 55-65). On the four sides of the light box, 20 980 nm-LEDs (1 Watt) and twenty 535 nm-LEDs (1 Watt) were evenly placed for light stimulation. Intensity of 980 nm light at the center of the light box was $8.1 \times 10^7$ photons·$\mu m^{-2}$·$s^{-1}$, and intensity of 535 nm light was $9.1 \times 10^2$ photons·$\mu m^{-2}$·$s^{-1}$. Animals were introduced to the box and allowed for 5 mins adaptation. A series of light stimulation in the order of 5 mins dark, 5 mins in 980 nm light, and 5 mins in 535 nm light was programed. All these experiments were carried out in the dark environment and videos were acquired by an infrared camera and custom-made software. Experiments were performed 4-5 weeks after injection.

Light Induced Fear Conditioning

Fear conditioning experiments were carried out in a 21.5 cm×21.5 cm×24 cm custom-made box (Cui et al., 2013) (FIG. 3a). On the four sides of the box, 20 980 nm-LEDs (1 Watt) and 20 535 nm-LEDs (1 Watt) were evenly placed for light stimulation. The training protocol consisted of 5 mins adaptation, 20 s 535 nm light as conditional stimulus (CS) followed with a 2 s electrical foot shock as unconditional stimulus (US). Paired CS and US was repeated 5 times with 2 mins interval. One day after the training, a test protocol, which was the same as the training protocol but no unconditional stimulus (US), was used to test freezing time of mice and in which 2 times 20 s 535 nm light and 2 times 980 nm light randomly as conditional stimulus (CS). Anilab (China) behavior software was used to control 980 nm or 535 nm-LEDs light stimulation and the electrical shock. Intensity of 980 nm light at the center of the box was $1.07 \times 10^8$ photons·$\mu m^2$ $s^{-1}$, and intensity of 535 nm light was $1.47 \times 10^3$ photons·$\mu m^{-2}$·$s^{-1}$. Freezing time ratios of Pre-CS (40 s before conditional stimulus) and CS (40 s, total time of the 2 times 980 nm or 535 nm conditional stimulus) were analyzed to compare the effect of light induced freezing. Experiments were conducted 4-5 weeks after injection.

Visually Evoked Potential (VEP)

1-2 weeks after pbUCNPs injection, VEP was carried out as described in literature (Cooke, et al. 2013 Philos T R Soc B 369. 20130284; Cooke et al. 2015 *Nat Neurosci* 18, 926-926). Mice were anesthetized by pentobarbital sodium (LUPI-P8410) at the dose of 1 g/kg body weight and then fixed on the stereotaxic apparatus. The skull on either right or left visual cortex was grinded off and removed carefully avoiding any damage to the visual cortex. An electrical recording glass pipette with a tip diameter of 15 μm was inserted into right/left visual cortex and targeted to the following coordinates: 1—(2.15, −2.8, −0.4), 2—(2.75, −2.8, −0.4), 3—(2.0, −3.28, −0.4), 4—(2.75, −3.28, −0.4), 5—(2.25, −4.24, −0.4), 6—(3.0, −4.24, −0.4) mm. A ground electrode was inserted into subcutaneous space of the tail and a reference electrode was inserted into subcutaneous space of the head. The contralateral eye of the exposed visual cortex was illuminated by 980 nm light ($7.07 \times 10^8$ photons·$\mu m^{-2}$·$s^{-1}$) or 535 nm light ($3.37 \times 10^3$ photons·$\mu m^{-2}$·$s^{-1}$) during recording. Signal was amplified by a differential amplifier (AM-SYSTEM INC) and digitized by Digital 1440A (Axon CNS).

Y Shaped Water Maze

Y-shaped water maze experiments were performed in either scotopic (dark) or photopic (light) condition. (Prusky, et al. 2000 *Vision Research* 40, 2201-2209.) During adaptation periods, mice were released in the water close to stimulating light boxes for discovering the hidden platform. The released place became further from the light boxes with time and ultimately mice were released at the release chute. The adaptation lasted for 2 days with one section (12 trials per section) per day. After adaptation mice were trained to find a hidden platform associated to the task stimuli. Trainings usually lasted for 7 days: one sections per day and 12 trials per section. The platform and the associated stimuli were placed right or left randomly across trials in each section, such as LRLRLLRRLRRL. Upon completion of the trainings, the test sections were run in two separated days. In Task #1 animals were trained with visible light horizontal and vertical light gratings (0.8 circles per degree, c/d, $7.26 \times 10^3$ photons·$\mu m^{-2}$·$s^{-1}$ at the release chute) and then tested to discriminate NIR horizontal and vertical light gratings ($8.01 \times 10^7$ photons·$\mu m^{-2}$·$s^{-1}$ at the release chute) in the dark background. For the visual acuity test in the dark background, 0.054 c/d, 0.08 c/d, 0.107 c/d, 0.134 c/d, 0.161 c/d, 0.214 c/d, 0.268 c/d, 0.322 c/d, 0.35 c/d, 0.38 c/d, 0.435 c/d gratings were tested for 980 nm light stimuli ($8.01 \times 10^7$ photons·$\mu m^{-2}$·$s^{-1}$ at the release chute) and 535 nm light stimuli ($7.26 \times 10^3$ photons·$\mu m^{-2}$·$s^{-1}$ at the release chute). In Task #2 animals were trained and tested to discriminate NIR light gratings made of LEDs arrays under the background visible room light. Two lines of 535 nm LEDs and two lines of 980 nm LEDS were placed perpendicular to each other. Each line was made of 18 LEDs. The left pattern was 90 degrees rotated compared to the right pattern. The training lasted for 10 days with one section per day and 12 trials per section with 980 nm LEDs on only. In task #2, the intensity of 980 nm light pattern measured at the release chute was $8.01 \times 10^7$ photons·$\mu m^{-2}$·$s^{-1}$ and 535 nm light pattern was $7.26 \times 10^3$ photons·$\mu m^{-2}$·$s^{-1}$. In Task #3 animals were trained with visible light triangle and circle patterns and tested to discriminate NIR light triangle and circle patterns in the dark background. In Task #4 animals were tested to discriminate visible light triangle and circle patterns in the NIR light background. In task #3 and task #4, the intensity of 980 nm light pattern measured at the release chute was $8.01 \times 10^7$ photons·$\mu m^{-2}$·$s^{-1}$ and 535 nm light pattern was $7.26 \times 10^3$ photons·$\mu m^{-2}$·$s^{-1}$. In Task #5 animals were tested to discriminate patterns in the mixture of visible and NIR light patterns. The hidden platform was associated with the triangle pattern and four different stimuli were presented randomly. (FIG. 6H.) In task #5, the intensity of 980 nm light pattern measured at the release chute was $2.32 \times 10^8$ photons·$\mu m^{-2}$·$s^{-1}$ and 535 nm light pattern was $1.57 \times 10^3$ photons·$\mu m^{-2}$·$s^{-1}$ All videos were acquired by infrared camera and analyzed by Corel Screen Cap X6 and Origin 8.0. Y shaped water maze experiments were implemented 3-8 weeks after pbUCNPs-injection. The spectrum of 980 nm LEDs were measured using spectrometer (Avantes USB2.0) to confirm there is no detectable visible light emission.

Applicant's disclosure is described herein in preferred embodiments with reference to the Figures, in which like numbers represent the same or similar elements. Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

The described features, structures, or characteristics of Applicant's disclosure may be combined in any suitable manner in one or more embodiments. In the description, herein, numerous specific details are recited to provide a thorough understanding of embodiments of the invention.

One skilled in the relevant art will recognize, however, that Applicant's composition and/or method may be practiced without one or more of the specific details, or with other methods, components, materials, and so forth. In other instances, well-known structures, materials, or operations are not shown or described in detail to avoid obscuring aspects of the disclosure.

In this specification and the appended claims, the singular forms "a," "an," and "the" include plural reference, unless the context clearly dictates otherwise.

Unless defined otherwise, all technical and scientific terms used herein have the same meaning as commonly understood by one of ordinary skill in the art. Although any methods and materials similar or equivalent to those described herein can also be used in the practice or testing of the present disclosure, the preferred methods and materials are now described. Methods recited herein may be carried out in any order that is logically possible, in addition to a particular order disclosed.

INCORPORATION BY REFERENCE

References and citations to other documents, such as patents, patent applications, patent publications, journals, books, papers, web contents, have been made in this disclosure. All such documents are hereby incorporated herein by reference in their entirety for all purposes. Any material, or portion thereof, that is said to be incorporated by reference herein, but which conflicts with existing definitions, statements, or other disclosure material explicitly set forth herein is only incorporated to the extent that no conflict arises between that incorporated material and the present disclosure material. In the event of a conflict, the conflict is to be resolved in favor of the present disclosure as the preferred disclosure.

EQUIVALENTS

The representative examples are intended to help illustrate the invention, and are not intended to, nor should they be construed to, limit the scope of the invention. Indeed, various modifications of the invention and many further embodiments thereof, in addition to those shown and described herein, will become apparent to those skilled in the art from the full contents of this document, including the examples and the references to the scientific and patent literature included herein. The examples contain important additional information, exemplification and guidance that can be adapted to the practice of this invention in its various embodiments and equivalents thereof.

The invention claimed is:

1. A nanoassembly comprising:
an upconversion nanoparticle (UCNP) sized between 28 nm and 48 nm having a core/shell structure; and
concanavalin A protein (ConA) covalently attached to the UCNP,
wherein the UCNP comprises $\beta$-NaYF$_4$:Yb and Er@ $\beta$-NaYF$_4$, wherein Yb is present at about 5% to about 99.5% and Er is present at about 0.1% to about 95%, and
is capable of converting a near infrared (NIR) light having a wavelength in the range of about 700 nm to about 1,700 nm to a wavelength in the visible region of about 400 nm to about 700 nm,
wherein
the UCNP is oxidized with nitrosonium tetrafluoroborate and coated with polyacrylic acid, and
the ConA is covalently coupled to the polyacrylic acid coated on the UCNP.

2. The nanoassembly of claim 1, wherein the ConA is covalently attached to the polyacrylic acid coated on the UCNP via (1-ethyl-3-(3-dimethylaminopropyl) carbodiimide) (EDC)/N-hydroxysuccinimide (NHS) coupling.

3. The nanoassembly of claim 2, being water soluble.

4. The nanoassembly of claim 2, being biocompatible.

5. A pharmaceutical composition suitable for ocular injection, comprising a nanoassembly of claim 1 and a pharmaceutically acceptable excipient, carrier, or diluent.

6. The pharmaceutical composition of claim 5, being suitable for sub-retinal space injection.

7. A mammal with a vision system having a sub-retinal space, wherein the mammal has been injected the pharmaceutical composition of claim 6 in the sub-retinal space and is capable of perceiving NIR light for 1 or more days post injection of the pharmaceutical composition.

8. The mammal of claim 7, wherein the mammal is a mouse or a dog.

9. The mammal of claim 8, wherein the mouse or dog is capable of perceiving NIR light pattern for about 1 or more days post injection of the pharmaceutical composition.

10. A mammal-device interface comprising:
an upconversion nanoparticle (UCNP) sized between 28 nm and 48 nm having a core/shell structure; and
concanavalin A protein (ConA) covalently attached to the UCNP,
wherein the UCNP comprises $\beta$-NaYF$_4$:Yb and Er@$\beta$-NaYF$_4$, wherein Yb is present at about 5% to about 99.5% and Er is present at about 0.1% to about 95%, and
is capable of converting a near infrared (NIR) light having a wavelength in the range of about 700 nm to about 1,700 nm to a wavelength in the visible region of about 400 nm to about 700 nm,
wherein
the UCNP is oxidized with nitrosonium tetrafluoroborate and coated with polyacrylic acid, and
the ConA is covalently coupled to the polyacrylic acid coated on the UCNP.

11. A method for treating an ocular disease or condition of a mammal comprising administering to a sub-retinal space of the mammal a pharmaceutical composition of claim 6.

* * * * *